(12) United States Patent
Matsuura et al.

(10) Patent No.: US 6,883,583 B2
(45) Date of Patent: Apr. 26, 2005

(54) DIE CHANGING APPARATUS OF MOLDING DIE

(75) Inventors: Yoshiki Matsuura, Toyota (JP); Tsukasa Kato, Toyota (JP); Takashi Hirai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/326,163

(22) Filed: Dec. 23, 2002

(65) Prior Publication Data

US 2003/0138513 A1 Jul. 24, 2003

(30) Foreign Application Priority Data

Dec. 26, 2001 (JP) ........................................ 2001-394719
Dec. 26, 2001 (JP) ........................................ 2001-394720

(51) Int. Cl.[7] ............................................. B22D 17/26
(52) U.S. Cl. ........................ 164/342; 164/339; 164/341
(58) Field of Search .............................. 164/342, 113, 164/137, 339, 341

(56) References Cited

U.S. PATENT DOCUMENTS 4,899,803 A * 2/1990 Arana-Erana ................ 164/158
6,564,855 B1 * 5/2003 Salata ......................... 164/113

FOREIGN PATENT DOCUMENTS

| DE | 42 19 920 | 1/1993 |
| DE | 100 59 045 | 2/2002 |
| JP | 01-271213 | 10/1989 |
| JP | 06-190531 | 7/1994 |
| JP | 09-070653 | 3/1997 |
| JP | 09-122871 | 5/1997 |

* cited by examiner

Primary Examiner—Kiley S. Stoner
Assistant Examiner—I. H. Lin
(74) Attorney, Agent, or Firm—Finnegan, Henderson, Farabow, Garrett & Dunner, LLP

(57) ABSTRACT

The invention achieves a more effective die changing work, reduces a time required for performing die changing of work of a die, and improves an operational availability of a molding machine, in various kinds of molding dies. A die changing operation can be efficiently performed by drawing out an exclusive portion which is automatically attached to and detached from a general portion of a molding die, from the general portion by a feeding means and pressing the exclusive portion to the general portion. Further, the exclusive portion (an old insert) drawn out to a predetermined position from the general portion can be carried out to an outer side of a die casting machine by a carrying means, and another exclusive portion (a new insert) can be carried in to a predetermined position within the machine from the outer side thereof, within the machine in a die unclamp state. A subject to be treated by the feeding means and the carrying means in the die changing operation is only the exclusive portion, and the subject to die changing can be made compact and light in comparison with the case that a whole of the die is changed.

14 Claims, 15 Drawing Sheets

DIE CHANGING APPARATUS OF MOLDING DIE

BACKGROUND OF THE INVENTION

1. Field of the Invention

The present invention relates to an automatic die changing apparatus of a die for rapidly performing a die changing of a die with respect to a molding machine.

2. Description of the Prior Art

Conventionally, for obtaining a die cast product having a large size and a complex structure such as a cylinder block, the die requires a slide. Accordingly, a whole of the die becomes heavy (196 kN (about 20 ton) for one example) and large in scale (about 2 m for one example), it is extremely troublesome to take out the die from the molding machine and it is necessary to take out and insert a tie bar connecting a fixed portion to a movable portion, so that there is a problem that an effect of shortening the die changing time is extremely small.

Further, a part of some work, for example, work for attaching and detaching a hose for a die cooling water and a cable for operation control with respect to the die are manually performed. That is, work performed by the die changing apparatus and the manual work are mixed. Further, at a time of the manual works, it is necessary to temporarily shut off a power source of the die changing apparatus completely. In order to safely perform the die changing work, the working procedure is expected to be careful.

The working procedure mentioned above of course requires a lot of time, and causes a decrease of operational availability in the molding machine. Further, in many cases, a portion to be repaired is only a portion constituting a product surface in a whole of the die in most cases, and a lot of time is required for work for taking out the whole of the die from the molding machine despite that such a repair is finished in a comparatively short time. Accordingly, this procedure is a major case for decreasing efficiency of the repairing work.

In this case, in a structure disclosed in Japanese Patent Laid-Open Publication No. 6-190531, only a part (a core) of the exclusive portion is replaced, with leaving the general portion in the molding machine, however, since a method of fastening the exclusive portion by bolts is employed, it is necessary to perform the fastening operation within the molding machine having a limited space, and a deterioration in operability and an unsafe operation can not be avoided. Further, since the exclusive portion is fastened by the bolts from a front surface thereof, it is impossible to apply the work to the exclusive portion in which the front surface constitutes the cavity forming surface, and an applicable range thereof is limited.

The problem mentioned above is not applied only to the die changing of a casting die, but is a common problem for dies in accordance with the other various casting methods and a die for resin molding. It is conventionally desired to achieve a more effective die changing work.

SUMMARY OF THE INVENTION

The present invention is made in consideration of the problems mentioned above, and an object of the present invention is to achieve a more effective die changing work, reduce a time required for performing die changing, improve an operational availability of a molding machine and restrict an increase of production cost, in various kinds of molding dies.

Further, another object of the present invention is to rapidly and securely perform work for taking out the exclusive portion to a predetermined position from the general portion and pressing the exclusive portion at the predetermined position to a predetermined position within the general portion, within the molding machine in a die unclamp state so as to reduce a time required for the die changing work.

Further, a still another object of the present invention is to rapidly and securely perform work for moving the exclusive portion taken out to the predetermined position from the general portion between an outer side of the molding machine and an inner side of the molding machine, within the molding machine in the die unclamp state, and reduce the time required for the die changing. Further, a yet another object of the present invention is to make it unnecessary to insert and take out a tie bar connecting a fixed portion and a movable portion which were conventionally essential at a time of performing die changing, and promote a reduction of time required for performing die changing.

In order to solve the problems mentioned above, a die changing apparatus of a molding die in accordance with the present invention is provided with a commonly formed general portion, and an exclusive portion having a cavity; and the exclusive portion is automatically attached to and detached from the general portion mounted to a molding machine by an attaching and detaching mechanism. In this apparatus, a feeding means for drawing out the exclusive portion to a predetermined position apart from the general portion and pressing the exclusive portion at the predetermined position to a predetermined position within the general portion, within the molding machine in a die unclamp state.

In this case, the feeding means is provided with a die carrying means which is engaged with the exclusive portion so as to move, and a guide means for guiding the exclusive portion onto a predetermined moving passage.

Further, the die carrying means is constituted by a moving body which moves in a die opening and closing direction or with a predetermined angle with respect to the die opening and closing direction.

Further, the moving body is provided with a clamp mechanism which is capable of being automatically attached to and detached from the exclusive portion.

Further, the guide means is provided with a guide roller disposed to a side of the moving passage of the exclusive portion and a guide roller disposed below the moving passage.

Further, the guide means includes a gap holding means which is provided at the exclusive portion side and holds a gap between the exclusive portion and the general portion at a time of pressing the exclusive portion into the general portion.

Further, the gap holding means is a rolling bearing which is elastically energized to an exclusive portion mounting recess portion of the general portion.

Further, the feeding means is provided with a positioning means for fixing the die carrying means and the guide means to a predetermined position with respect to the general portion.

Further, the positioning means employs an extensible pin which is engaged with a hole formed in the general portion.

On the contrary, the feeding means is provided in a carrying means which is movable between an outer portion of the molding machine and an inner portion of the molding machine.

Further, the carrying means is provided with a shift means for moving a plurality of tables having mounting portions for the exclusive portion in a direction intersecting to the die opening and closing direction.

Further, a base plate having a shape allowing the base plate to move on a roller for performing die changing of the general portion is provided, and the table and the shift means are provided on the base plate.

Further, the base plate is provided with a supporting means which is brought into contact with a rigid portion of the molding machine at a time of necessity and supports the base plate from below.

Further, the supporting means is a jack grounded on a tie bar of the molding machine.

Since the present invention is structured in the manner mentioned above, it is possible to achieve a more efficient die changing operation so as to shorten a time required for the die changing operation of the die, improve an operational availability and restrict an increase of product cost, in various kinds of molding die.

Further, in accordance with the present invention, it is possible to rapidly and securely perform the operation for drawing out the exclusive portion to the predetermined position apart from the general portion and pressing the exclusive portion existing at the predetermined position to the predetermined position within the general portion, within the molding machine in the die unclamp state, and shorten the time required for performing die changing.

Further, in accordance with the present invention, it is possible to rapidly and securely perform the operation for moving the exclusive portion drawn out to the predetermined position from the general portion between the outer side of the molding machine and the inner side of the molding machine, within the molding machine in the die unclamp state, and shorten the time required for performing die changing. Further, it is possible to make it unnecessary to draw and insert the tie bar connecting the fixed portion to the movable portion which is essentially performed at a time of performing die changing conventionally, and it is possible to shorten the time required for performing die changing.

DESCRIPTION OF THE PREFERRED EMBODIMENT

Figure 1:
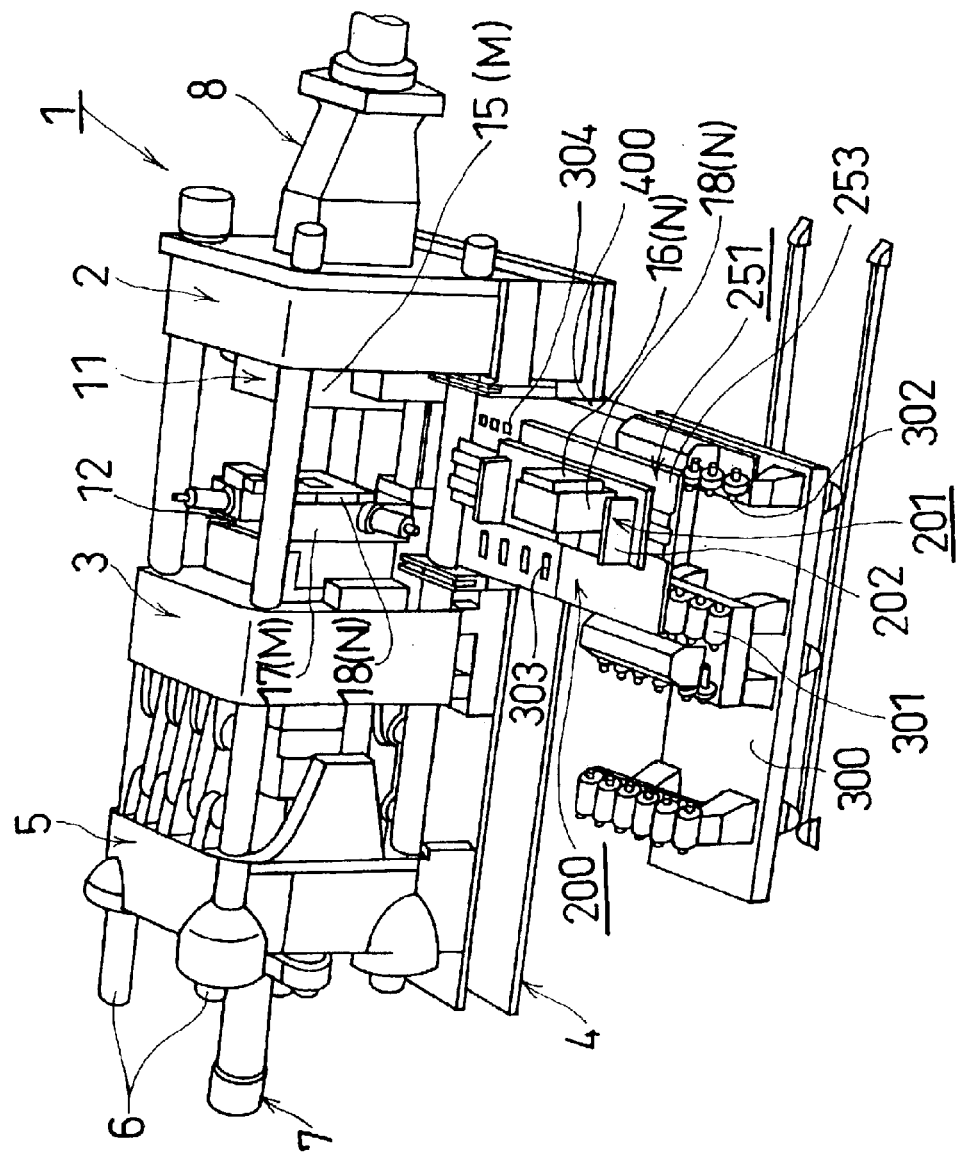
FIG. 1 is a schematic view of a whole of a die casting machine provided with a die changing apparatus in accordance with an embodiment of the present invention.

A description of embodiments in accordance with the present invention will be given below with reference to the accompanying drawings. In this case, the same reference numerals are attached to the same parts and the corresponding parts to the prior art, and a detailed description will be omitted.

FIG. 1 shows a schematic view of an entire die casting machine 1 provided with a die changing apparatus 200 in accordance with an embodiment of the present invention. In this case, first, a description will be briefly given of a structure of the die casting machine 1. The die casting machine 1 has a fixed platen 2 for mounting a fixed die 11, and a movable platen 3 for mounting a movable die 12. The movable platen 3 is slidably guided by four tie bars 6 which are bridged between a fixed platen 2 arranged on one end portion of a stand 4 and a fixed table 5 arranged on another end portion of the stand 4, and have a extremely high rigidity, and moves apart from or close to the fixed platen 2.

Further, it is possible to closely attach the movable die 12 to the fixed die 11 so as to achieve a die close state by moving the movable platen 3 close to the fixed platen 2, and reversibly, it is possible to move the movable die 12 apart from the fixed die 11 so as to achieve a die unclamp state by moving the movable platen 3 apart from the fixed platen. The movable platen 3 is driven by a mold clamping cylinder 7 provided in the fixed table 5. In this case, in FIG. 1, reference numeral 8 denotes an injection cylinder which is provided in a back surface side of the fixed platen 2 and for injecting a molten metal into the die.

Both of the fixed die 11 and the movable die 12 are separated into a commonly formed general portion M and an exclusive portion N having a cavity. In more detail, the fixed die 11 has a fixed main die 15 corresponding to the general portion M and a fixed insert 16 corresponding to the exclusive portion N, and the movable die 12 has a movable main die 17 corresponding to the general portion M and a movable insert 18 corresponding to the exclusive portion N. Further, both of the fixed insert 16 and the movable insert 18 can be automatically attached and detached by an attaching and detaching mechanism to be mentioned later, in a state in which the fixed main die 15 and the movable main die 17 are mounted to the die casting machine 1.

In this case, a die changing apparatus 200 in accordance with the embodiment of the present invention is provided with a feeding means 201 and a carrying means 251. The feeding means 201 has a function of drawing out the integrated fixed insert 16 and movable insert 18 (hereinafter, referred to as an "exclusive portion assembly 16, 18) to a predetermined position apart from the fixed main die 15 and the movable main die 17 and pressing the exclusive portion assembly 16, 18 existing at the predetermined position to a predetermined position within the movable main die 17, within the molding machine in the die unclamp state. On the other hand, the carrying means 251 has a function of moving the exclusive portion assembly 16, 18 drawn out to the predetermined position from the fixed main die 15 and the movable main die 17 between the inner side and the outer side of the die casting machine 1. A description will be given below of a structure of the feeding means 201 and the carrying means 251.

Figure 2:
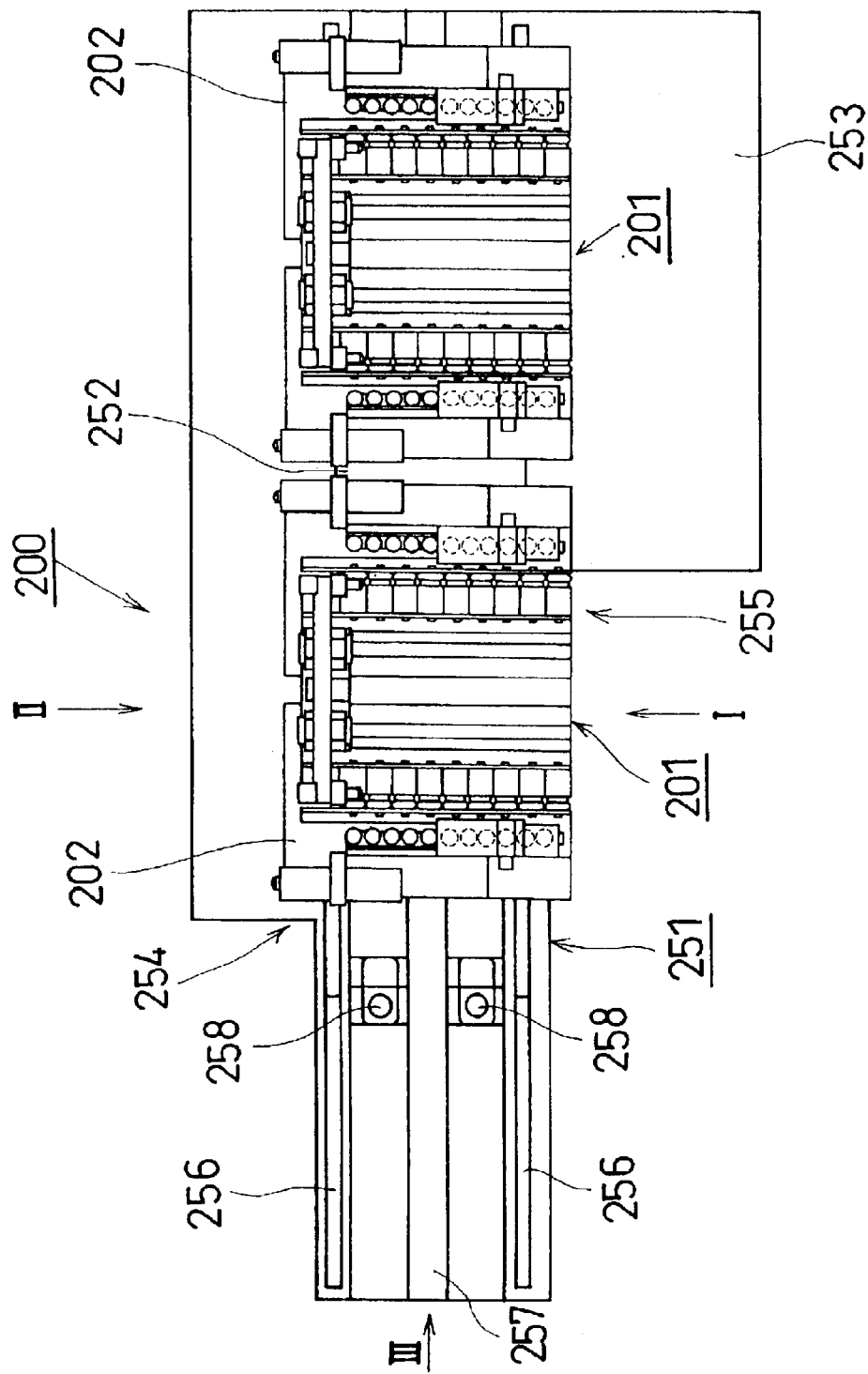
FIG. 2 is a plan view of a main portion of the die changing apparatus shown in FIG. 1.
Figure 3:
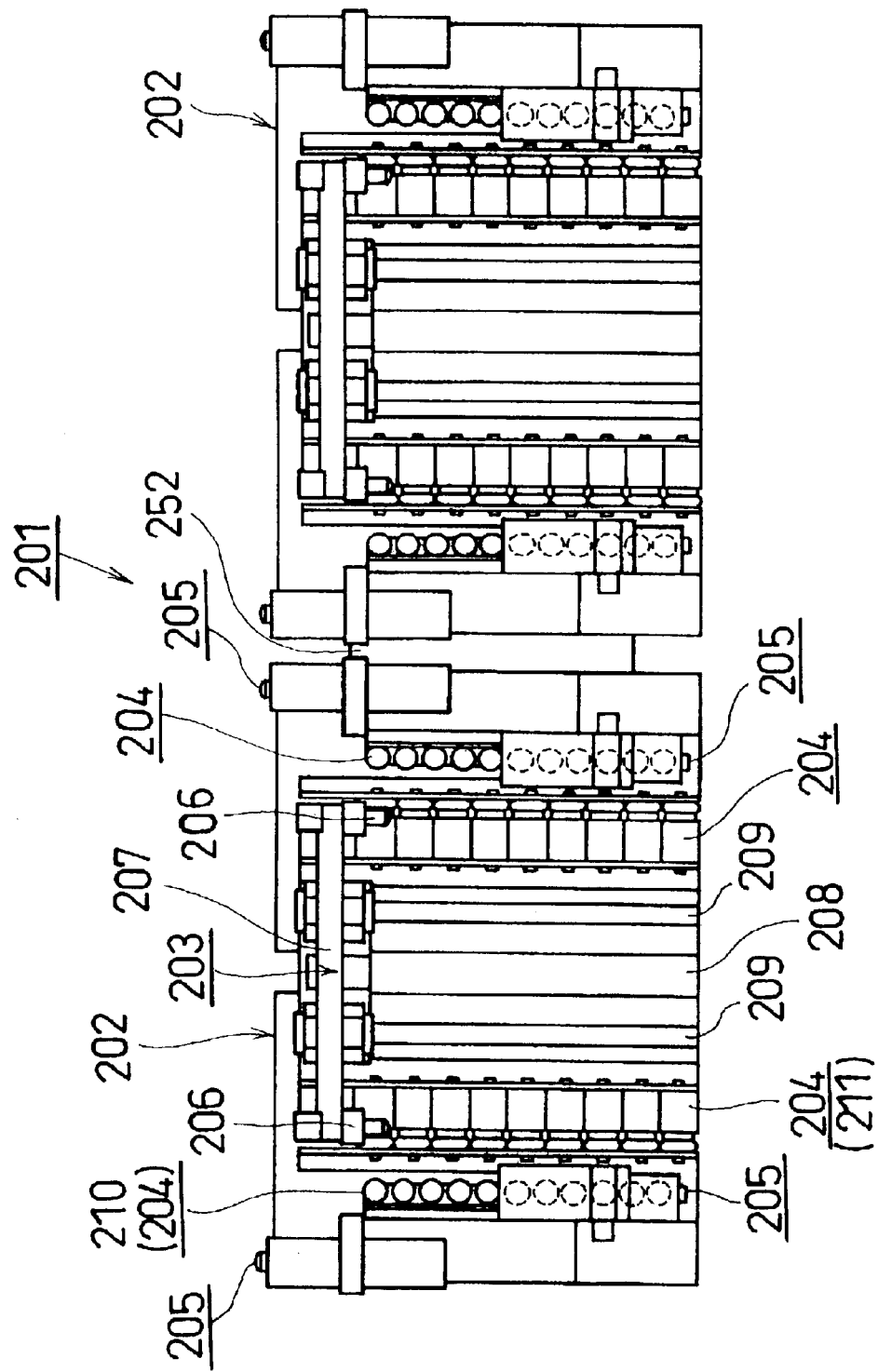
FIG. 3 is an enlarged view which shows a feeding means of the die changing apparatus shown in FIG. 2.
Figure 4:
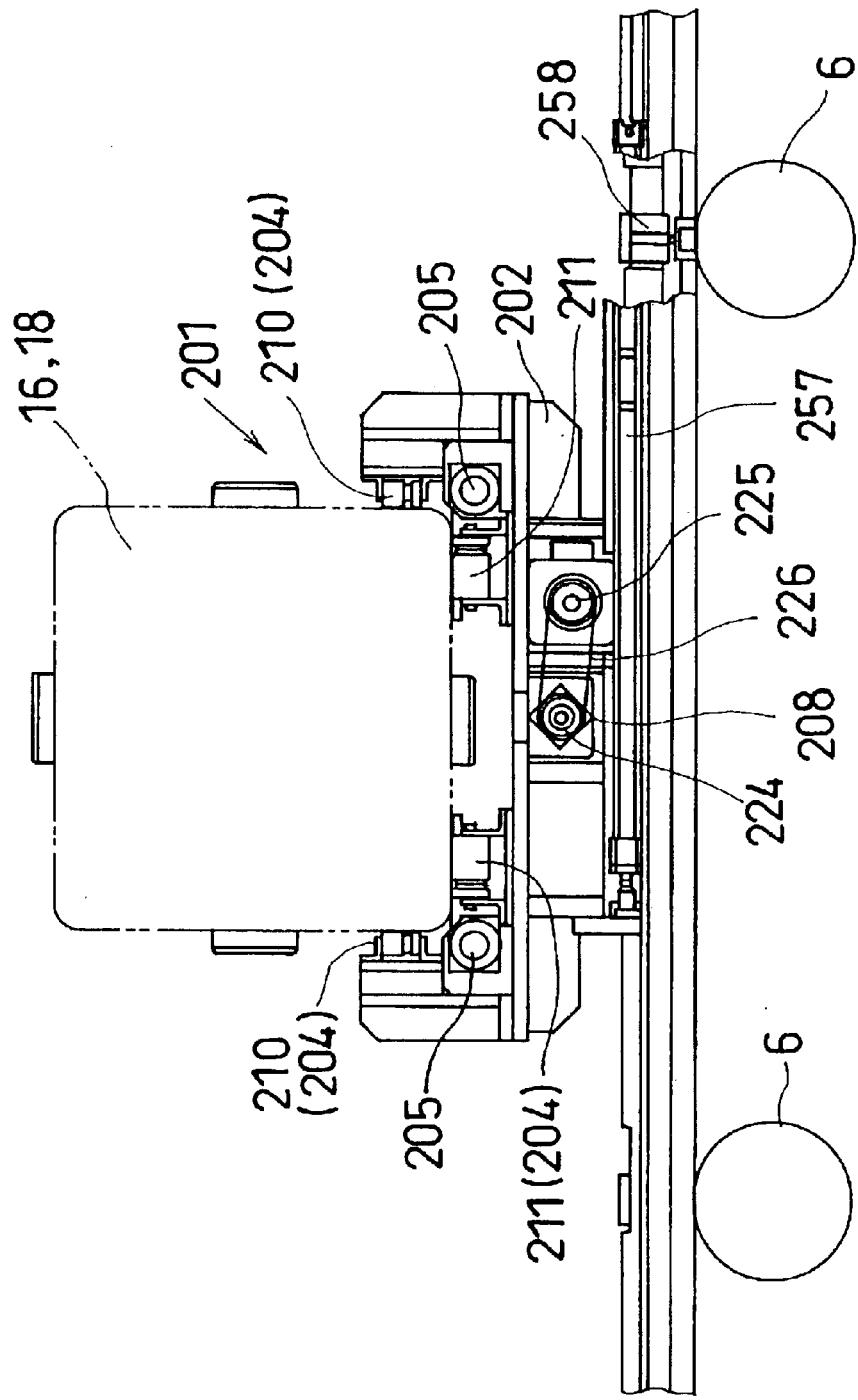
FIG. 4 is a view of the die changing apparatus shown in FIG. 2 as seen from an arrow I.
Figure 5:
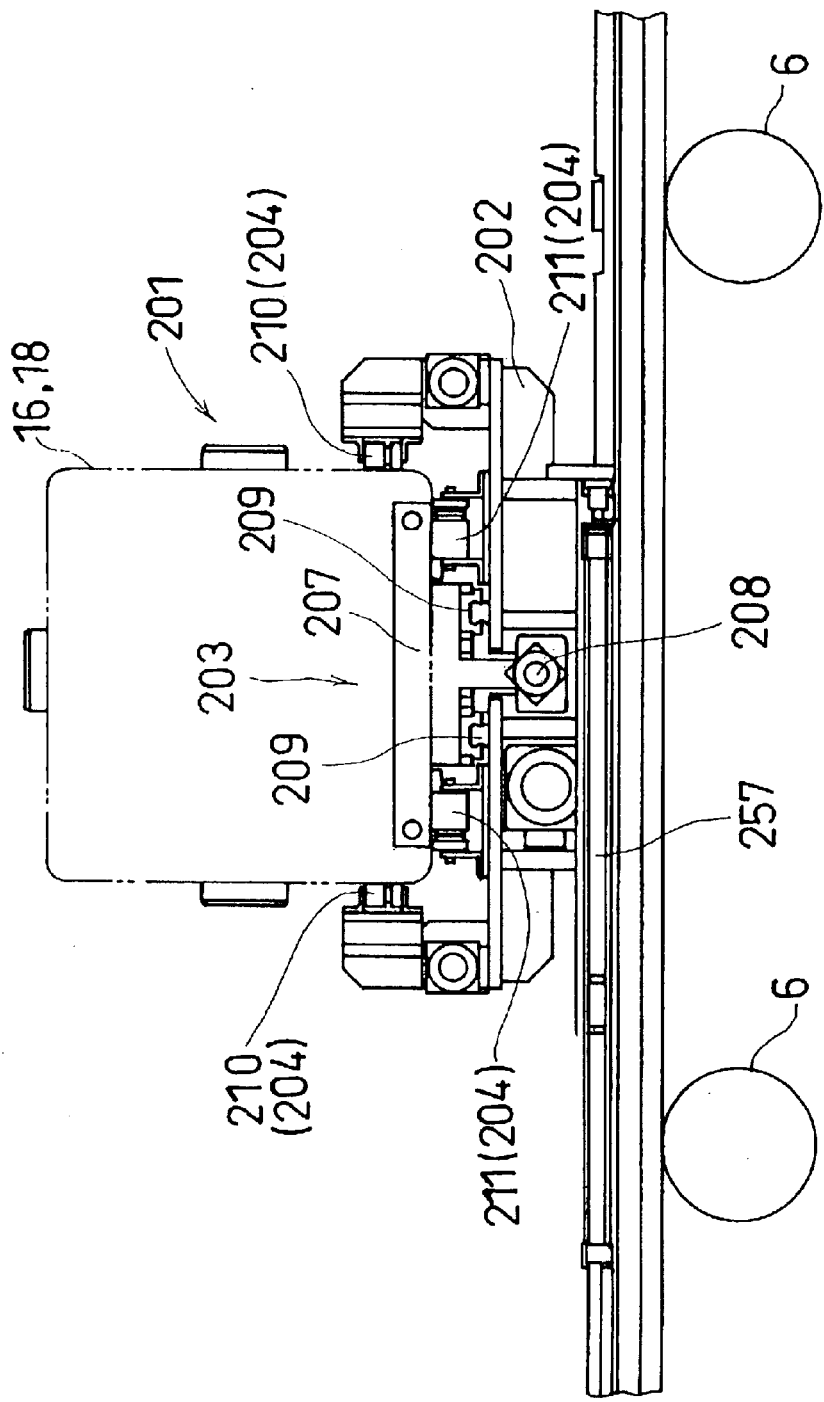
FIG. 5 is a view of the die changing apparatus shown in FIG. 2 as seen from an arrow II.

FIG. 2 is a plan view of a main portion of the die changing apparatus 200. Further, FIG. 3 shows the feeding means 201 of the die changing apparatus 200 shown in FIG. 2 in an enlarged manner. Further, FIG. 4 is a view as seen from an arrow I in FIG. 2, FIG. 5 is a view as seen from an arrow II in FIG. 2, and FIG. 6 is a view as seen from an arrow III in FIG. 2, respectively.

The die changing apparatus 200 is arranged in a direction orthogonal to a die opening and closing direction in a state in which the die casting machine 1 is positioned in a left side in FIG. 2, the fixed platen 2 of the die casting machine 1 is positioned in an upper side in FIG. 2, and the movable platen 3 of the die casting machine 1 is positioned in a lower side in FIG. 2. Then, the feeding means 201 is provided on the carrying means 251 in a layered manner.

More particularly, the feeding means 201 is provided with a table 202 as a base plate (hereinafter, referred to as a "shift table 202") which can shift in the direction orthogonal to the die opening and closing direction, a die carrying means 203 which moves in a state of being engaged with the exclusive portion assembly 16, 18, and a guide means 204 which guides the exclusive portion assembly 16, 18 on a predetermined moving passage. Further, the feeding means 201 also functions as a mounting portion for mounting the exclusive portion assembly 16, 18. Further, the feeding means 201 is provided with a positioning means 205 for fixing the die carrying means 203 and the guide means 204 to a predetermined position with respect to the fixed main die 15 and the movable main die 17 in the die unclamp state.

Figure 6:
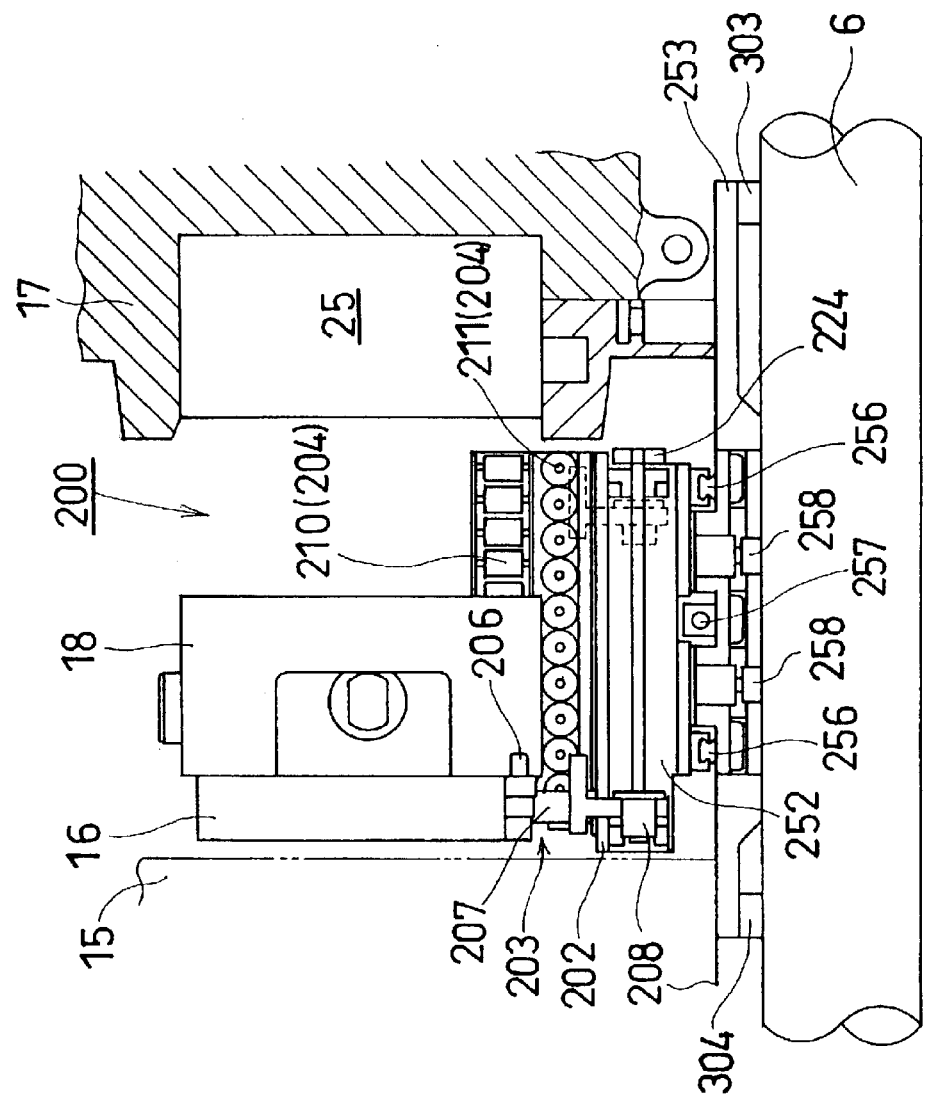
FIG. 6 is a view of the die changing apparatus shown in FIG. 2 as seen from an arrow III.

The die carrying means 203 is provided with a ball lock mechanism 206 which can be automatically attached to and detached from the movable insert 18, as shown in FIG. 6. The ball lock mechanism 206 is supported to a moving body 207 including a horizontally extending arm. Further, the moving body 207 is structured such as to be driven by a ball screw mechanism 208 so that the moving body 207 can move in the die opening and closing directions, and be guided by a guide rail 209 as shown in FIG. 5. Accordingly, it is possible to press out or draw in the exclusive portion assembly 16, 18 to the die opening and closing direction, by engaging the ball lock mechanism 206 with the movable insert 18 and moving the moving body 207.

The guide means 204 has a guide roller 210 which is positioned to the side of on the moving passage at a time of pressing out or drawing in the exclusive portion assembly 16, 18 in the die opening and closing directions, and a guide roller 211 which is positioned below the moving passage. Accordingly, the exclusive portion assembly 16, 18 is guided accurately on a predetermined moving passage by the guide rollers 210 and 211 at a time of moving by the die carrying means 203.

Figure 7:
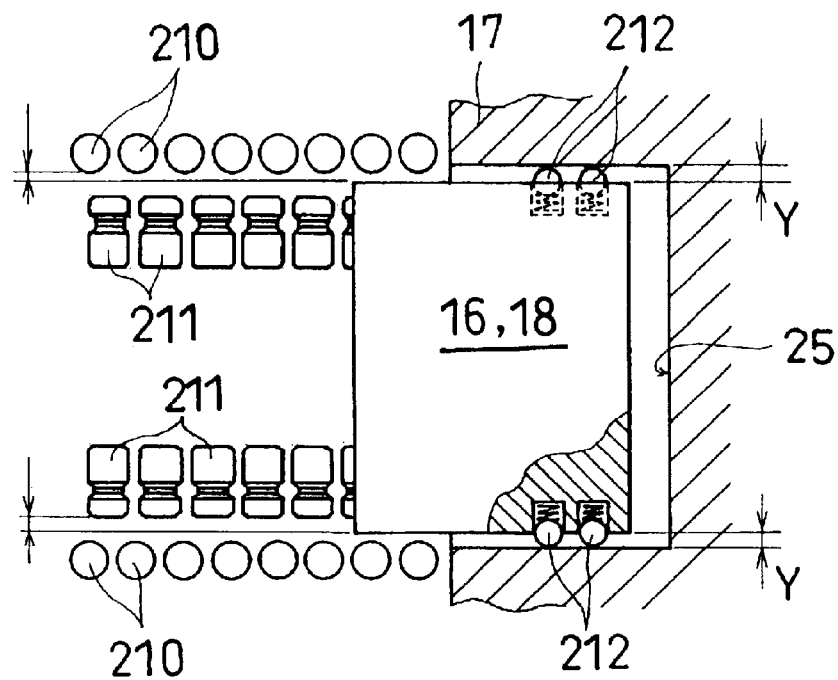
FIG. 7 is a schematic view explaining a function of a rolling bearing provided in a movable insert, which constitutes a guide means of the die changing apparatus in accordance with an embodiment of the present invention.
Figure 8:
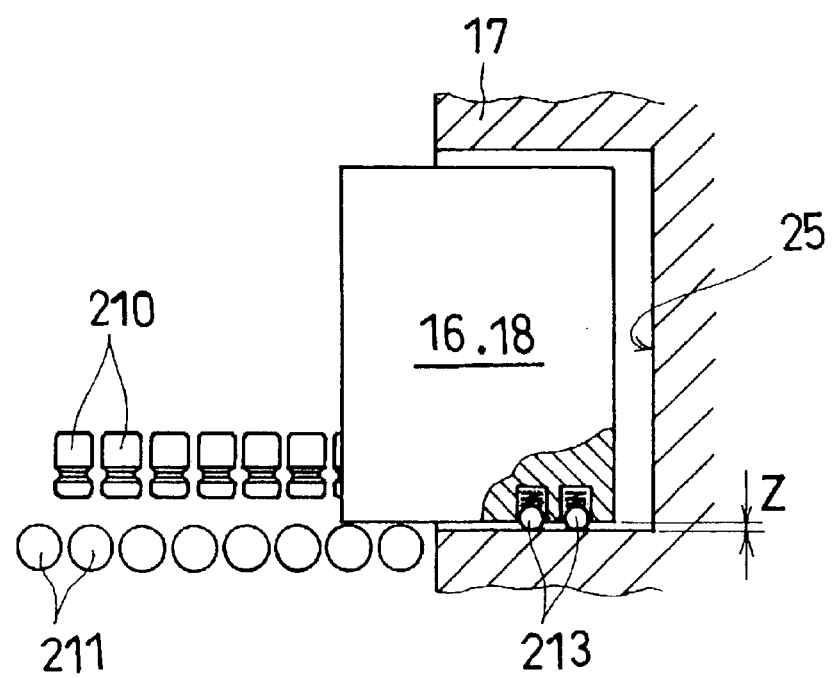
FIG. 8 is a schematic view explaining the function of the rolling bearing provided in the movable insert, as seen from a different direction from that in FIG. 7.

Further, the guide means 204 is provided with a gap holding means for holding a gap between the movable insert 18 and the movable main die 17 at a time of pressing the exclusive portion assembly 16, 18 to the movable main die 17. The gap holding means mentioned above is constituted by a rolling bearing 212 (refer to FIG. 7) and a rolling bearing 213 (refer to FIG. 8) which are provided in the movable insert 18, and are elastically energized to a recess portion 25 for mounting the exclusive portion in the movable main die 17. Further, as shown in FIGS. 7 and 8, at a time of pressing the movable insert 18 to the movable main die 17, although a portion of the movable insert 18 entering the recess portion 25 of the movable main die 17 can not be guided by the guide rollers 210 and 211, the rolling bearings 212 and 213 can hold an interval between the movable insert 18 and the recess portion 25 of the movable main die 17 in appropriate distances Y and Z, and it is possible to smoothly press the exclusive portion assembly 16, 18 into the recess portion 25.

Figure 9:
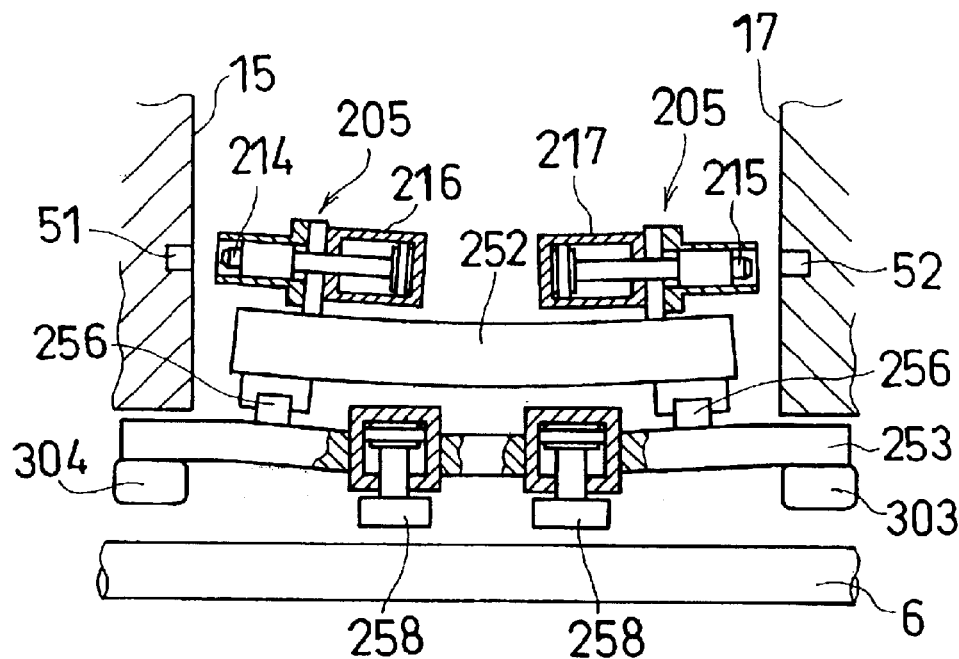
FIG. 9 is a cross sectional view which shows a positioning means provided in the feeding means of the die changing apparatus in accordance with the embodiment of the present invention, and a supporting means provided in the carrying means, and shows an inoperative state of the positioning means and the supporting means.
Figure 10:
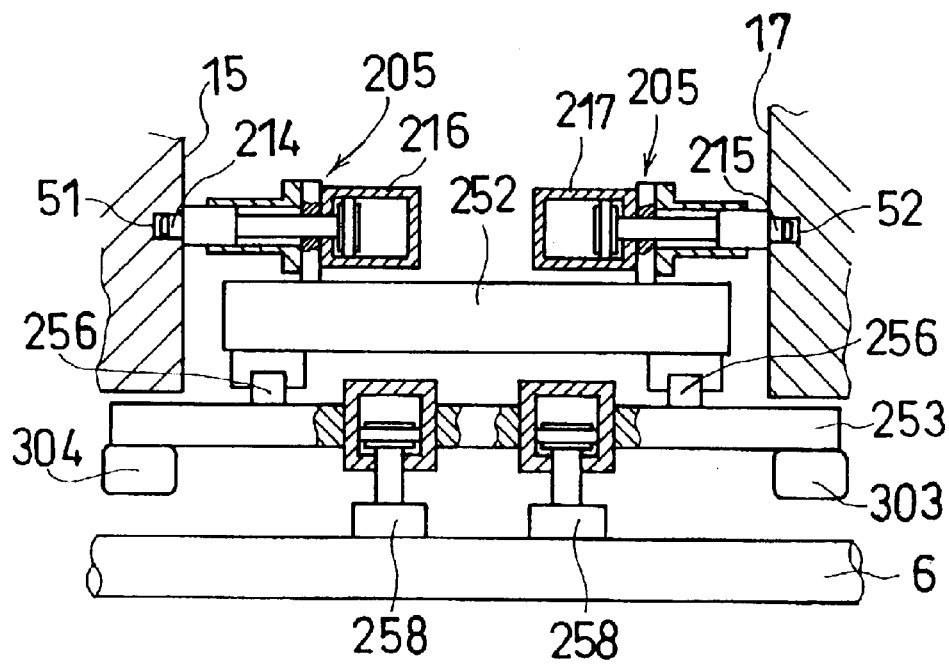
FIG. 10 is a cross sectional view which shows a positioning means provided in the feeding means of the die changing apparatus in accordance with the embodiment of the present invention, and a supporting means provided in the feeding means, and shows an operative state of the positioning means and the supporting means.

Further, the positioning means 205 has pins 214 and 215 which are engaged with holes 51 and 52 formed in the fixed main die 15 and the movable main die 17, as shown in FIGS. 9 and 10. The pins 214 and 215 are controlled in an extensible manner by hydraulic or air driven cylinders 216 and 217 which are fixed to the shift table 202. Then, by engaging the pins 214 and 215 with the holes 51 and 52, the shift table 202 can be accurately positioned with respect to the fixed main die 15 and the movable main die 17, the die carrying means 203 and the guide means 204 (refer to FIG. 6) provided on the shift table 202 can be accurately positioned with respect to the fixed main die 15 and the movable main die 17, and die changing of the exclusive portion assembly 16, 18 can be smoothly performed.

In this case, in the embodiment in accordance with the present invention, both of the die carrying means 203 and the guide means 204 are structured such that the exclusive portion assembly 16, 18 is taken out from the recess portion 25 and the pressing direction is the die opening and closing direction, however, the present invention is not limited to this. The structure may be made such that the means mentioned above moves with a predetermined angle with respect to the die opening and closing direction. It is preferable that such angle is set in a range within 5 degrees with respect to the die opening and closing direction.

On the other hand, the carrying means 251 is provided with a base plate 253 as shown in FIG. 2. The base plate 253 has a shape allowing the base plate 253 to move on rollers 301, 302, 303 and 304 shown in FIG. 1 for general portion die changing. Further, a plurality of (two in an illustrated embodiment) shift tables 202 of the feeding means 201 are integrally connected by a connection plate 252, and are structured such as to integrally move on the base plate 253 in a direction orthogonal to the die opening and closing direction. The general portion die changing rollers 301, 302, 303 and 304 are respectively drive rollers, and can transfer the base plate 253 mounted thereon in the direction orthogonal to the die opening and closing direction.

In this case, the general portion die changing rollers 301 and 302 are provided on a carrying truck 300 which can mount a plurality of general portions so as to move, and the general portion die changing rollers 303 and 304 are provided on a relay table 400 disposed between the carrying truck 300 and the die casting machine 1. Further, in the general portion die changing rollers 303 and 304, as schematically shown in FIGS. 9 and 10, a part thereof is connected to the inner portion of the die casting machine, and forms an inboard roller. Further, the general portion die changing rollers 301, 302, 303 and 304 are arranged with a predetermined interval between the rollers 301 and 302, and the rollers 303 and 304 so as to make it possible to perform die changing of the general portion. Further, both of the carrying truck 300 and the relay table 400 have been conventionally attached to the die casting machine 1 as die changing equipment.

Further, in the embodiment in accordance with the present invention, the general portion die changing rollers 301, 302, 303 and 304 are provided in the direction orthogonal to the die opening and closing direction. That is, these rollers are structured such as to transfer the base plate 253 in the direction orthogonal to the die opening and closing direction. However, the present invention is not limited to the direction mentioned above, and can be structured such as to transfer the base plate 253 at an obtuse angle or an acute angle with respect to the die opening and closing direction. Then, the space to the side of the die casting machine 1 can be secured and such space can be effectively utilized by making the structure such as mentioned above.

A depth (a side in a lateral direction in FIG. 2) of the base plate 253 in the carrying means 251 is set longer than the integrally connected plurality of shift tables 202, and every shift table 202 can move to a center portion of the base plate 253 from a portion close to an end portion of the base plate 253. Further, a width (a size in a vertical direction in FIG. 2) of the base plate 253 is set to a width capable of being carried all over the general portion die changing rollers 301, 302, 303 and 304. Further, a notch portion 254 for avoiding an interference with the fixed main die 15 mounted to the fixed platen 2, and a notch portion 255 for avoiding an interference with the movable main die 17 mounted to the movable platen 3 are formed in a portion through which the base plate 253 enter the inner portion of the die casting machine 1.

In this case, the base plate 253 positively employs a thin structure in order to make it unnecessary to draw out and insert in the tie bar 6 which is conventionally essential at a time of performing die changing. In this case, in FIGS. 4 to 6, a gap between the base plate 253 and the tie bar 6 is not clearly shown, however, a slight gap for preventing contact is practically provided between the base plate 253 and the tie bar 6. The gap mentioned above is shown in FIGS. 9 and 10 rhetorically. Further, by positively making the base plate 253 thinner, a slight deflection is generated in the base plate 253, however, the problem caused by the generation of deflection can be solved by a jack 258 to be mentioned later.

Further, a shift means for moving the integrally connected plurality of shift tables 202 in the direction orthogonal to the die opening and closing direction is provided in the base plate 253. This shift means is provided with a guide rail 256 placed substantially all around the depth of the base plate 253, and a cylinder 257 having a stroke capable of moving the shift tables 202 all around the guide rail 256.

Accordingly, by mounting the exclusive portion assembly 16, 18 (hereinafter, referred also to as a "new insert") to be newly mounted to the machine, on one shift table 202, making the base plate 253 enter the inner portion of the die casting machine 1, mounting the exclusive portion assembly 16, 18 (hereinafter, referred also to as an "old insert") taken out from the machine on another shift table 202, and moving the shift table 202 on the base plate 253, the new and old inserts can be replaced with each other for a short time.

In this case, in the case that the structure is made such that the base plate 253 is transferred at the obtuse angle or the acute angle with respect to the die opening and closing direction, the shifting direction of the shift table 202 becomes an obtuse angle or an acute angle with respect to the die opening and closing direction. Accordingly, it is possible to secure the space to the side of the die casting machine 1 and it is possible to effectively utilize the space.

Further, the base plate 253 is provided with the jack 258, as supporting means which is brought into contact with a rigid portion of the molding machine at a necessary time so as to support the base plate 253 from below. The jack 258 is grounded on the tie bar 6 of the die casting machine 1 in a state in which the base plate 253 enters the inner portion of the die casting machine 1, as shown in FIGS. 6, 9 and 10, thereby supporting the base plate 253 from below and correcting the deflection of the base plate. Further, the deflection of the shift table 202 on the base plate 253 is corrected by correcting the deflection of the base plate 253, whereby it is possible to fix the die carrying means 203 and the guide means 204 (refer to FIG. 6) to a predetermined position with respect to the fixed main die 15 and the movable main die 17 in the die unclamp state.

In this case, a description will be given of a procedure for performing die changing of the exclusive portion assembly 16, 18 with using the die changing apparatus 200 provided with the feeding means 201 and the carrying means 251, and a description will be further given of detailed structures and functions of the respective portions.

First, as a preliminary step for performing die changing of the movable insert 16 and the fixed insert 18 by the die changing apparatus 200, as shown in FIG. 1, the base plate 253 of the carrying means 251 is positioned on the general portion die changing rollers 301, 302, 303 and 304 in the carrying truck 300 and the relay table 400. Further, one of two shift tables 202 (FIG. 2) of a feeding apparatus 201 is set to an empty load state for mounting the exclusive portion assembly 16, 18 (the old insert) taken out from the machine, and the exclusive portion assembly 16, 18 (the new insert) newly mounted to the machine is previously mounted to another shift table.

Figure 15:
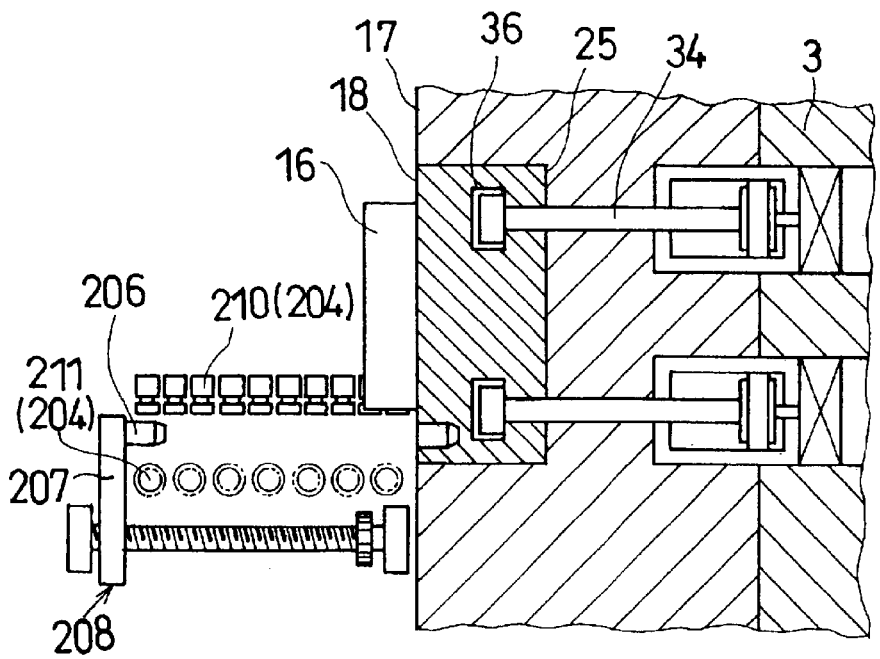
FIG. 15 is a schematic view which shows a procedure of performing the die changing of the exclusive portion assembly in the die changing apparatus in accordance with the embodiment of the present invention, and shows a state before and after the state in FIG. 14.

Further, as shown in FIG. 15, the fixed insert 16 is integrated (in accordance with a procedure to be mentioned later) with the movable insert 18 previously fixed to the movable main die 17. Next, the fixed main die 15 and the movable main die 17 are set to the die unclamp state. At this time, the movable insert 18 is fixed by the attaching and detaching mechanism so as to be closely attached to a recess portion bottom of a recess portion 25 provided in the movable main die 17.

The attaching and detaching mechanism mentioned above is structured such that the a T-shaped clamper 34 extended from the side of the movable main die 17 can not be drawn out from a T-shaped slot 36 provided in a back surface portion of the fixed insert 18 by aligning and inserting the T-shaped clamper 34 with the T-shaped slot 36 and rotating the T-shaped clamper 34. The exclusive portion assembly 16, 18 can be drawn into the recess portion 25 of the movable main die 17 and the movable insert 18 can be closely attached to the recess portion bottom of the recess portion 25 by retracting the T-shaped clamper 34.

In this case, in the state shown in FIG. 15, the general portion die changing rollers 301, 302, 303 and 304 (in FIG. 1) are driven, and the base plate 253 of the carrying means 251 is moved into the inner portion of the die casting machine 1. At this time, as shown in FIG. 9, the base plate 253 generates a slight deflection due to its own weight.

In the state in which the deflection is generated in the base plate 253, the deflection is induced to the shift table 202 on the base plate 253, and it becomes impossible to fix the die carrying means 203 and the guide means 294 which are provided on the shift table to the predetermined positions with respect to the fixed main die 15 and the movable main die 17 which are in the die unclamp state. Then, as shown in FIG. 10, the deflection can be corrected by grounding the jack 258 on the tie bar 6 and supporting the base plate 253 from below.

After correcting the deflection of the base plate 253, the pins 214 and 215 of the positioning means 205 provided on the shift table 202 with no load are engaged with the holes 51 and 52 formed in the fixed main die 15 and the movable main die 17, and the shift table 202 with no load is accurately positioned with respect to the fixed main die 15 and the movable main die 17. In accordance with such positioning, the die carrying means 203 and the guide means 204 (refer to FIG. 6) which are provided on the shift table 202 are accurately positioned with respect to the fixed main die 15 and the movable main die 17, and the exclusive portion assembly 16, 18 can be smoothly received.

Figure 14:
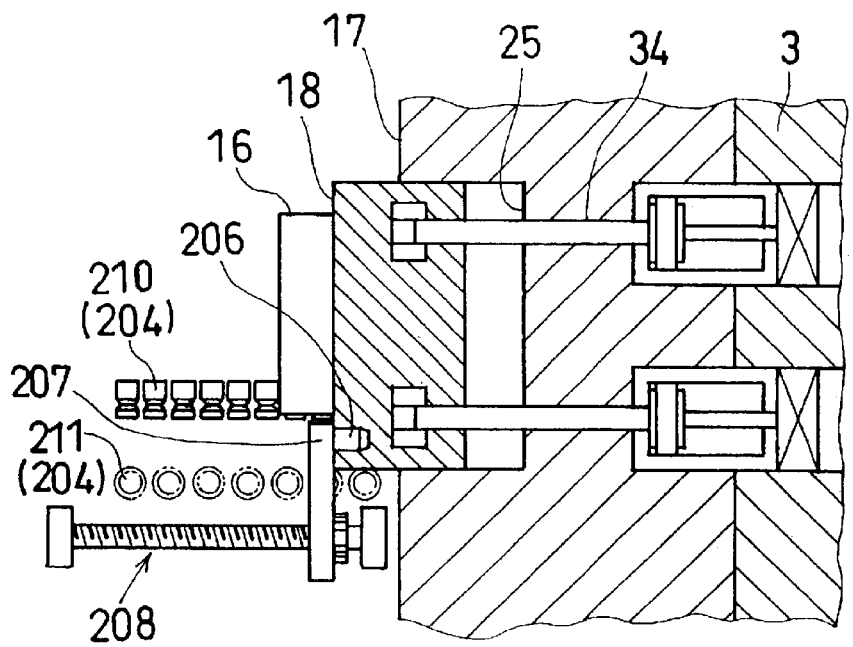
FIG. 14 is a schematic view which shows a procedure of performing the die changing of the exclusive portion assembly in the die changing apparatus in accordance with the embodiment of the present invention, and shows a state before and after the state in FIG. 13.

Next, the T-shaped clamper 34 is extended as shown in FIG. 14 from the state in FIG. 15 which is described as the preliminary step. Next, the exclusive portion assembly 16, 18 is pressed out from the recess portion 25 of the movable main die 17 by the extended length of the T-shaped clamper 34. Then, the exclusive portion assembly 16, 18 is moved to a predetermined position within the movable main die 17. Further, after releasing the fluid pressure of the clamping cylinder of the T-shaped clamper 34, the T-shaped clamper 34 is rotated to an angle at which the T-shaped clamper 34 can be drawn out from the T-shaped slot 36.

In this case, the moving body 207 of the die carrying means 203 is driven by a ball screw mechanism 208 so as to move close to the movable insert 18, and the ball lock mechanism 206 is connected to the movable insert 18. In this case, the ball screw mechanism 208 is structured, as shown in FIG. 4, such that the power is supplied by a belt 226 wound between a driven pulley 224 fixed to an end portion of the ball screw shaft and a drive pulley 225 fixed to a rotary shaft of an electric motor.

Figure 12:
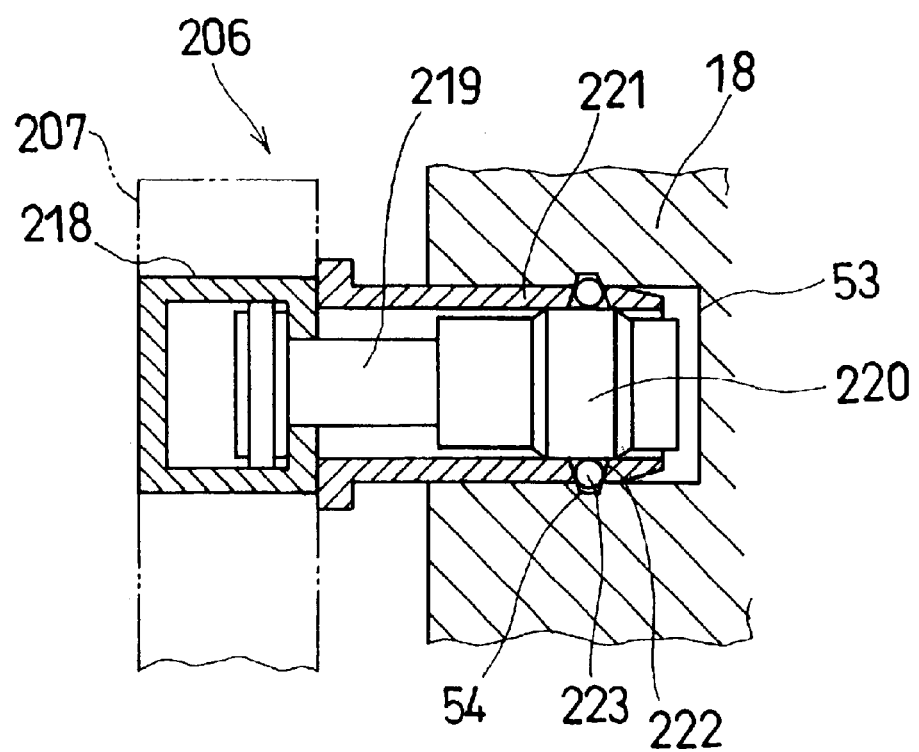
FIG. 12 is an enlarged cross sectional view which shows a ball lock mechanism of a die carrying means in the die changing apparatus in accordance with the embodiment of the present invention.

Further, the ball lock mechanism 206 has a structure in which a large diameter portion 220 is formed in a piston rod 219 of a hydraulic or air driven cylinder 218, and a ball 223 is protruded to an outer side of a guide sleeve 221 from an opening 222 formed in the guide sleeve 221 at a time when the large diameter portion 220 is positioned at the opening 222, as shown in FIG. 12. Then, the ball lock mechanism 206 can be connected to the movable insert 18 by fitting and inserting the ball 223 protruding to the outer side of the guide sleeve 221 to a recess portion 54 of a guide sleeve receiving hole 53 provided in the movable insert 18. On the other hand, the ball 223 can be stored in the inner portion of the guide sleeve 221 by moving the piston rod 219 backward so as to move the large diameter portion 220 to a position deflecting from the opening 222, whereby the connection between the ball lock mechanism 206 and the movable insert 18 is cancelled.

In this case, the cylinder 218 constructing the ball lock mechanism 206 is attached to the moving body 207 so that the cylinder can float slightly in a direction orthogonal to the axial direction, and secures a certainty of connection between the ball lock mechanism 206 and the guide sleeve receiving hole 53 provided in the movable insert 18.

Figure 13:
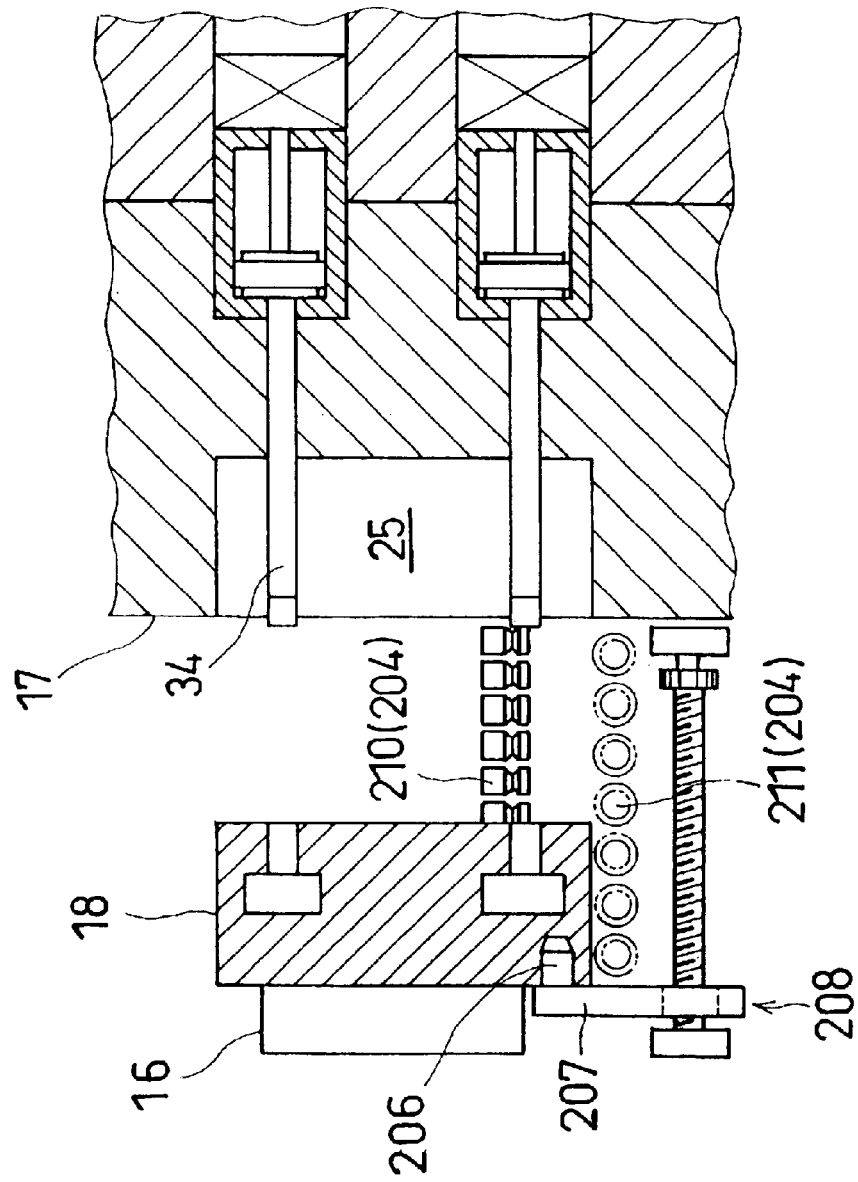
FIG. 13 is a schematic view which shows a procedure of performing a die changing of an exclusive portion assembly in the die changing apparatus in accordance with the embodiment of the present invention.

Further, the exclusive portion assembly 16, 18 can be drawn out from the recess portion 25 of the movable main die 17 as shown in FIG. 13 by moving the moving body 207 in a direction in which the moving body gets apart from the movable main die 17 by the ball screw mechanism 208 after connecting the ball lock mechanism 206 to the movable insert 18 as shown in FIG. 14. At this time, it is possible to assist the movement of the exclusive portion assembly 16, 18 by further extending the T-shaped clamper 34 and pressing out the movable insert 18. Further, the movable insert 18 is guided accurately onto a predetermined moving passage by the guide roller 210 positioned to the side of the moving passage and the guide roller 211 positioned on the lower side of the moving passage, and is accurately transferred onto the shift table 202 with no load. FIG. 6 shows a state of the die changing apparatus 200 at this time.

Next, the engagement of the pins 214 and 215 of the positioning means 205 in a state shown in FIG. 10 with the holes 51 and 52 formed in the fixed main die 15 and the movable main die 17 is cancelled. Subsequently, the jack 258 grounded on the tie bar 6 is stored (FIG. 9), the shift table 202 is driven by the cylinder 257 (FIGS. 4 to 6), and the shift table 202 is moved along the guide rail 256 of the base plate 253. Then, the old insert is taken out from the moving passage at a time of attaching and detaching the exclusive portion assembly 16, 18 with respect to the fixed main die 15 and the movable main die 17, and the new insert is arranged in place thereof. At this time, since the shift table 202 only moves a limited distance on the base plate 253 (refer to FIG. 2), it is possible to complete a replacement between the new and old inserts for an extremely short time.

Then, the jack 258 provided on the base plate 253 is again grounded on the tie bar 6, thereby supporting the base plate 253 from below, and the pins 214 and 215 of the positioning means 205 are engaged with the holes 51 and 52 formed in the fixed main die 15 and the movable main die 17 (FIG. 10). Accordingly, the shift table 202 mounted with the new insert is accurately positioned with respect to the fixed main die 15 and the movable main die 17. At this time point, the respective portions of the die changing apparatus 200 are in the states shown in FIGS. 6 and 13. In this case, as for the new insert, the ball lock mechanism 206 is connected to the movable insert 18 at a time when the new insert is mounted to the shift table 202 in the external side of the machine, whereby its position on the shift table 202 is fixed and the position shift at a time of moving is prevented.

Subsequently, the exclusive portion assembly 16, 18 can be pressed into the predetermined position within the recess portion 25 of the movable main die 17 as shown in FIG. 14 by driving the ball screw mechanism 208 so as to move the moving body 207 in the direction in which the moving body 207 is getting close to the movable main die 17, from the state shown in FIG. 13. At this predetermined position, the T-shaped clamper 34 extends from the side of the movable main die 17 and stands by, and the T-shaped clamper 34 is engaged with the T-shaped slot 36 provided in the back surface portion of the fixed insert 18.

Further, at a time of pressing the exclusive portion assembly 16, 18 to the movable main die 17, the portion of the movable insert 18 which has entered the recess portion 25 of the movable main die 17 can not be guided by the guide rollers 210 and 211 as shown in FIGS. 7 and 8. Instead, however, the rolling bearings 212 and 213 hold the interval between the movable insert 18 and the recess portion 25 of the movable main die 17 in appropriate distances Y and Z. Accordingly, it is possible to smoothly press the movable insert 18 into the recess portion 25.

Figure 11:
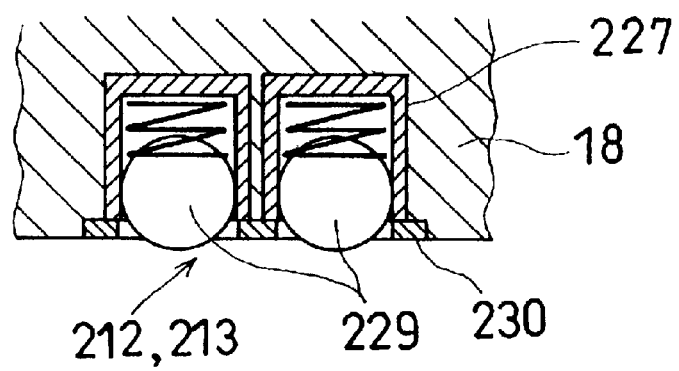
FIG. 11 is an enlarged cross sectional view of the rolling bearing shown in FIGS. 7 and 8.

In this case, each of the rolling bearings 212 and 213 is structured, as shown in FIG. 11 in an enlarged manner, such that a ball 229 is pressed into a case 227 embedded in the movable insert 18 together with a spring 228, and the ball 229 is locked by a stopper 230 so as to prevent the ball 229 from jumping out. Accordingly, when the ball 229 is brought into contact with a wall surface of the recess portion 25 in the movable main die 17, the ball 229 compresses the spring 228 while rotating, and holds the interval between the movable insert 18 and the recess portion 25 of the movable main die 17 in the appropriate distances Y and Z (FIGS. 7 and 8) by utilizing a repulsive force of the spring 228.

Then, in the state shown in FIG. 14, the ball lock mechanism 206 is disconnected from the movable insert 18, and the moving body 207 is moved apart from the movable insert 18 by the ball screw mechanism 208. The T-shaped clamper 34 is set to a state shown in FIG. 15 by rotating the T-shaped clamper 34 extended from the side of the movable main die 17 so as to make the T-shaped clamper 34 incapable of being drawn out from the T-shaped slot 36, and thereafter drawing the movable insert 18 into the recess portion 25 of the movable main die 17.

Further, the shift table 202 which becomes the unladen state by transferring the new insert to the movable main die 17 is turned back to an original position on the base plate 253 integrally with the shift table 202 mounted with the old insert by canceling the engagement of the pins 214 and 215 of the positioning means 205 with the holes 51 and 52 formed in the fixed main die 15 and the movable main die 17, and subsequently storing the jack 258 grounded on the tie bar 6 (FIG. 9). Further, the general portion die changing rollers 301, 302, 303 and 304 (FIG. 1) are driven, and the base plate 253 of the carrying means 251 is turned back on the carrying truck 300 and the relay table 400 from the inner portion of the die casting machine 1.

In the manner mentioned above, the procedure for performing die changing of the exclusive portion assembly 16, 18 by using the die changing apparatus 200 provided with the feeding means 201 and the carrying means 251 is completed.

Next, a description will be given of the attaching and detaching mechanism for automatically attaching and detaching the fixed insert 16 and the movable insert 18 in the fixed die 11 and the movable die 12 in a state in which the fixed main die 15 and the movable main die 17 are mounted to the die casting machine 1.

Figure 16:
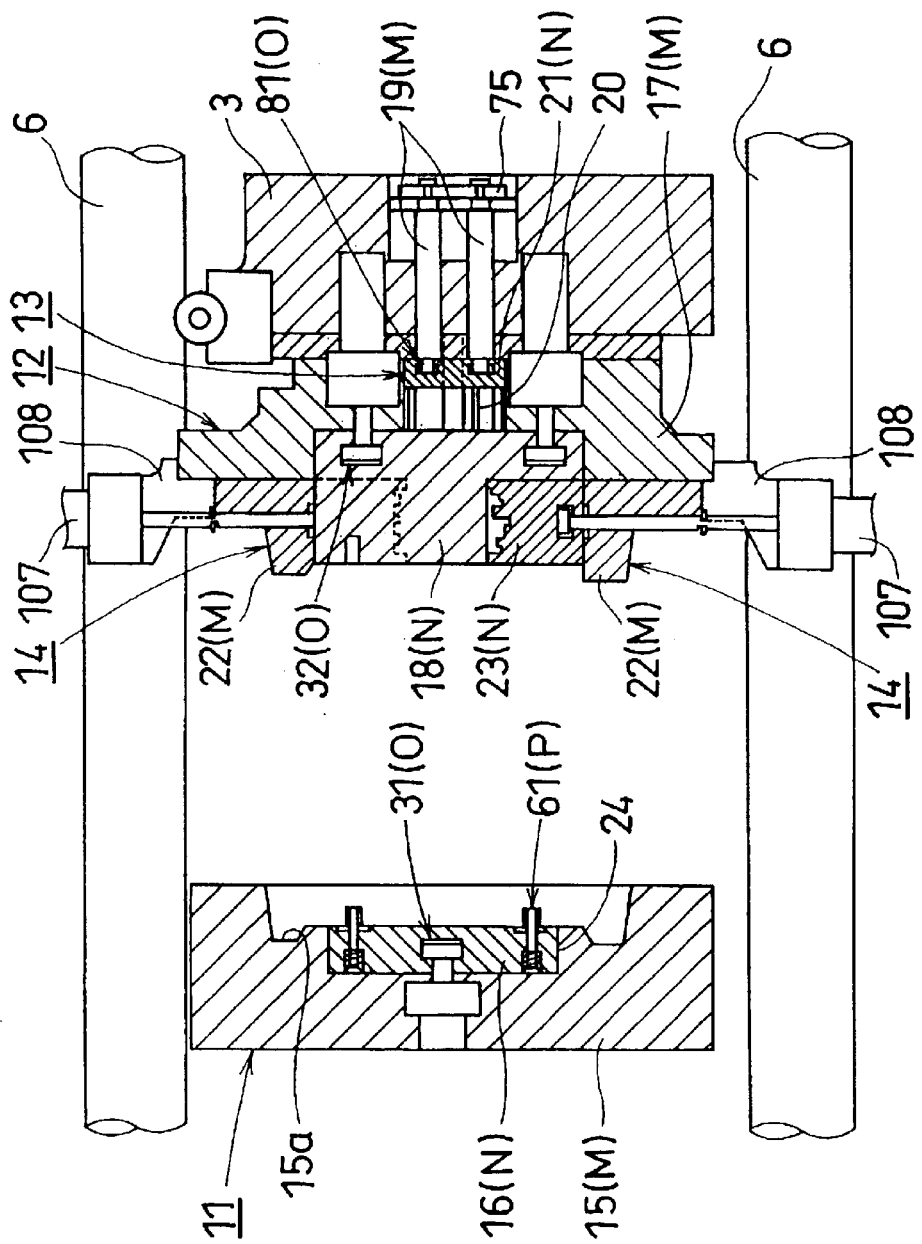
FIG. 16 is a cross sectional view which shows an entire structure of a molding die corresponding to one embodiment in accordance with the present invention, and shows a die unclamp state.
Figure 17:
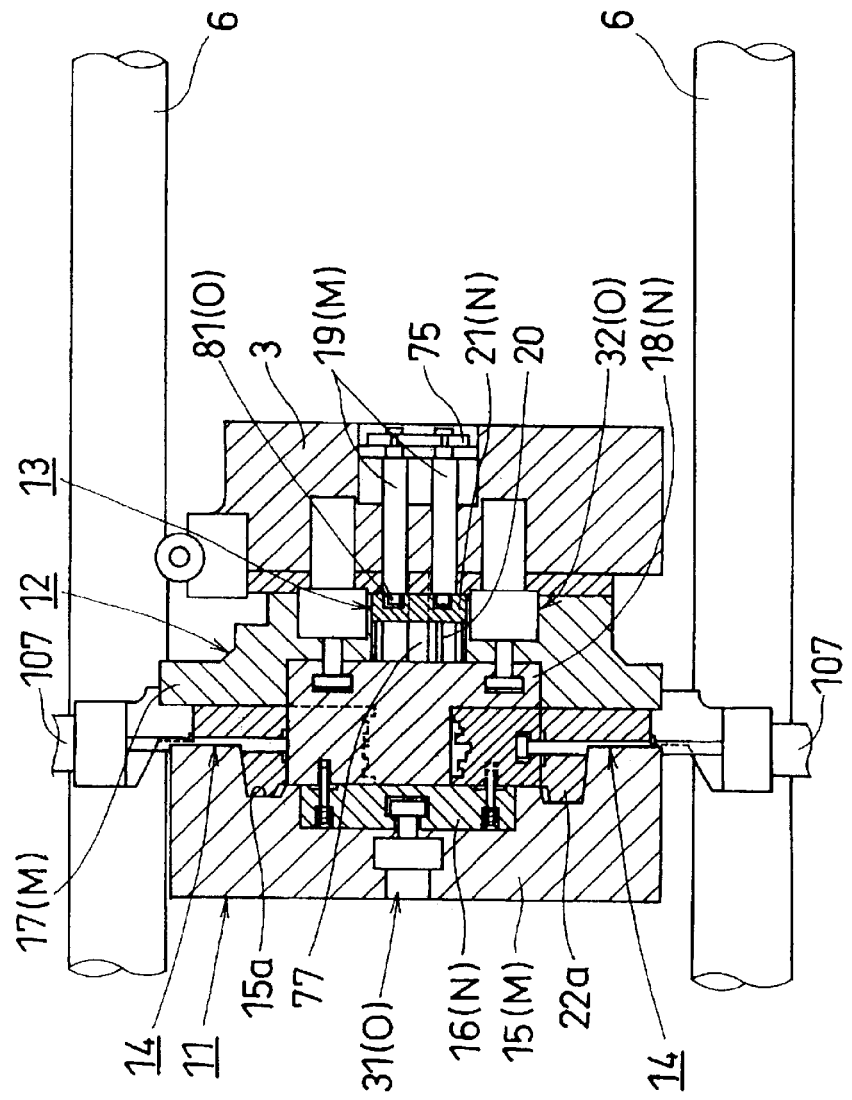
FIG. 17 is a cross sectional view which shows a die clamped state of the molding die shown in FIG. 16.
Figure 18:
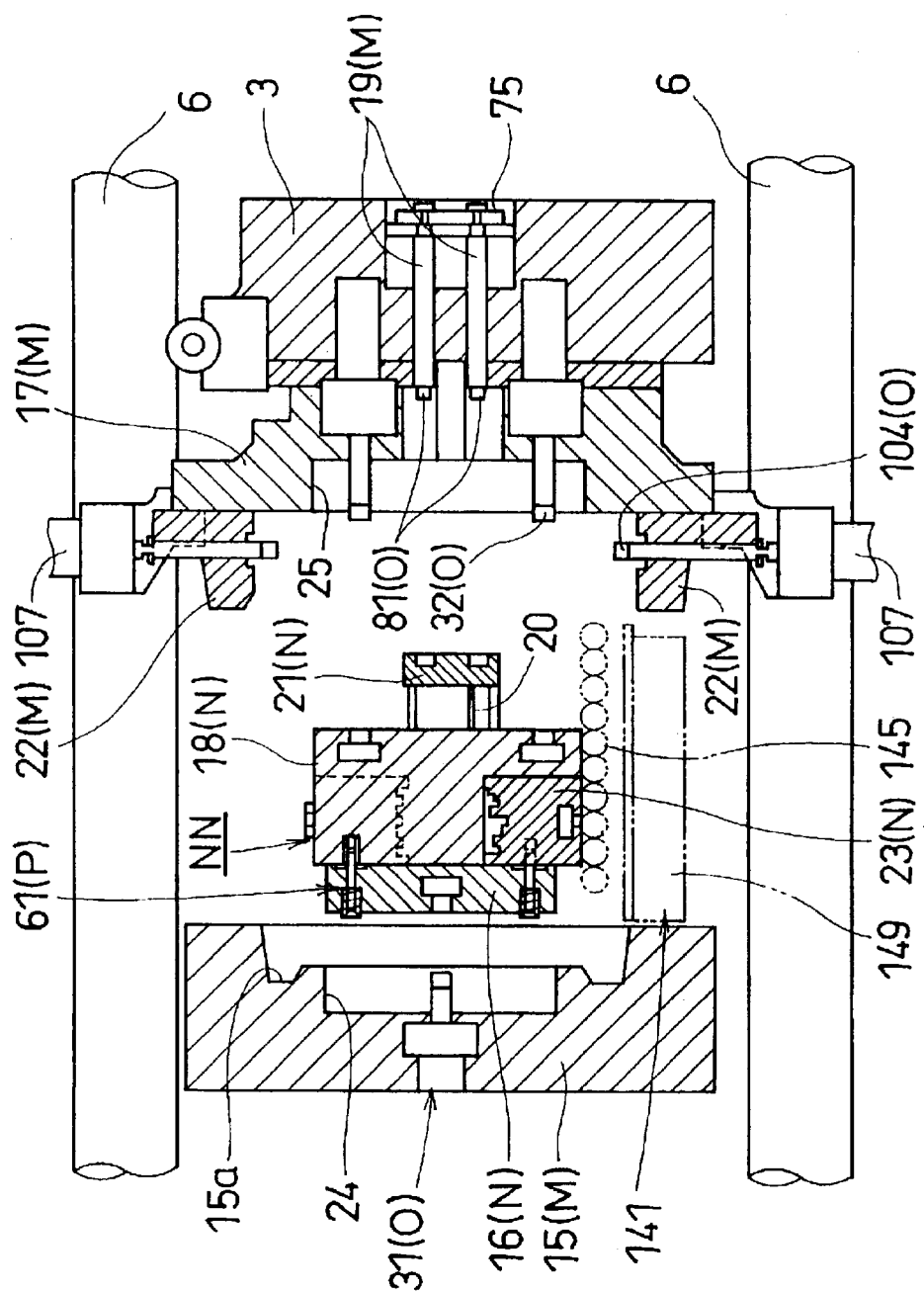
FIG. 18 is a cross sectional view which shows a state in which the exclusive portion of the molding die shown in FIGS. 16 and 17 is connected and integrated in a mutually die close state (a lump state) and is taken out from the general portion.

FIGS. 16 to 18 show an overall structure of the molding die corresponding to one embodiment in accordance with the present invention. The molding die is constructed as a die casting die equipped in a horizontal type die casting machine (molding machine). It is schematically constituted, as mentioned above, by the fixed die 11 mounted to the fixed platen 2 of the die casting machine (hereinafter, simply referred to as the machine) 1 shown in FIG. 1, the movable die 12 mounted to the movable platen 3 of the machine 1, a pressing means 13 attached to the movable die 12 and a plurality of (four) slides 14.

Each of the fixed die 11, the movable die 12, the pressing means 13 and the slide 14 mentioned above is separated into a commonly formed general portion M and an exclusive portion N forming a cavity, as mentioned above. In more detail, the fixed die 11 is constituted by a fixed main die 15 corresponding to the general portion M and a movable insert 16 corresponding to the exclusive portion N. The movable die 12 is constituted by a movable main die 17 corresponding to the general portion M and a movable insert 18 corresponding to the exclusive portion N. The pressing means 13 is constituted by a pressing rod 19 corresponding to the general portion M and a pressing plate 21 on which a pressing pin 20 is provided in a standing manner, corresponding to the exclusive portion N. Further, the slide 14 is constituted by a slide holder 22 corresponding to the general portion M and a slide core 23 corresponding to the exclusive portion N, respectively. Further, these exclusive portions N are automatically attached and detached with respect to the corresponding general portions M by respective attaching and detaching mechanisms O, and the exclusive portions N are automatically integrated with each other by a connection mechanism P.

The respective fixed die 11 and movable die 12 are structured such that the fixed insert 16 and the movable insert 18 are fitted to recess portions 24 and 25 provided in the fixed main die 15 and the movable main die 17, and the fixed insert 16 and the movable insert 18 are respectively attached and detached to and from the fixed main die 15 and the movable main die 17 by the attaching and detaching mechanisms O provided between bottom portions of the recess portions 24 and 25 and back surface portions of the fixed insert 16 and the movable insert 18 in this state, respectively.

The attaching and detaching mechanisms O for attaching and detaching the fixed insert 16 and the movable insert 18 to the fixed main die 15 and the movable main die 17 are constituted by clamp apparatuses 31 and 32 in this case. The clamp apparatuses 31 and 32 are structured such that the fixed insert 16 and the movable insert 18 are drawn into the recess portions 24 and 25 of the fixed main die 15 and the movable main die 17 by engaging and inserting T-shaped clampers 33 and 34 extended from the sides of the fixed main die 15 and the movable main die 17 with T-shaped slots 35 and 36 provided in back surface portions of the fixed insert 16 and the movable insert 18. Driving means 37 and 38 for driving the T-shaped clampers 33 and 34 are constituted by cylinders (drawing cylinders) for moving the T-shaped clampers 33 and 34 in an axial direction, and rotary mechanisms for rotating the T-shaped clampers 33 and 34. The drawing cylinders and the rotary mechanisms are installed in the corresponding fixed main die 15 and movable main die 17.

The connection mechanism P for connecting the fixed insert 16 to the movable insert 18 can employ a similar structure to the ball lock mechanism 206 (refer to FIG. 12) mentioned above, and a detailed description will be omitted.

The pressing means 13 is structured such that the pressing plate 21 corresponding to the exclusive portion N thereof is arranged between the movable main die 17 corresponding to the general portion M of the movable die 12 and the movable insert 18. In the bottom portion of the recess portion 25 in the movable main die 17, a guide hole 71 extending to the back surface side of the bottom portion is formed. Further, the pressing plate 21 is structured such as to be received within the guide hole 71 in a state in which the movable insert 18 is attached to the movable main die 17.

Figure 19:
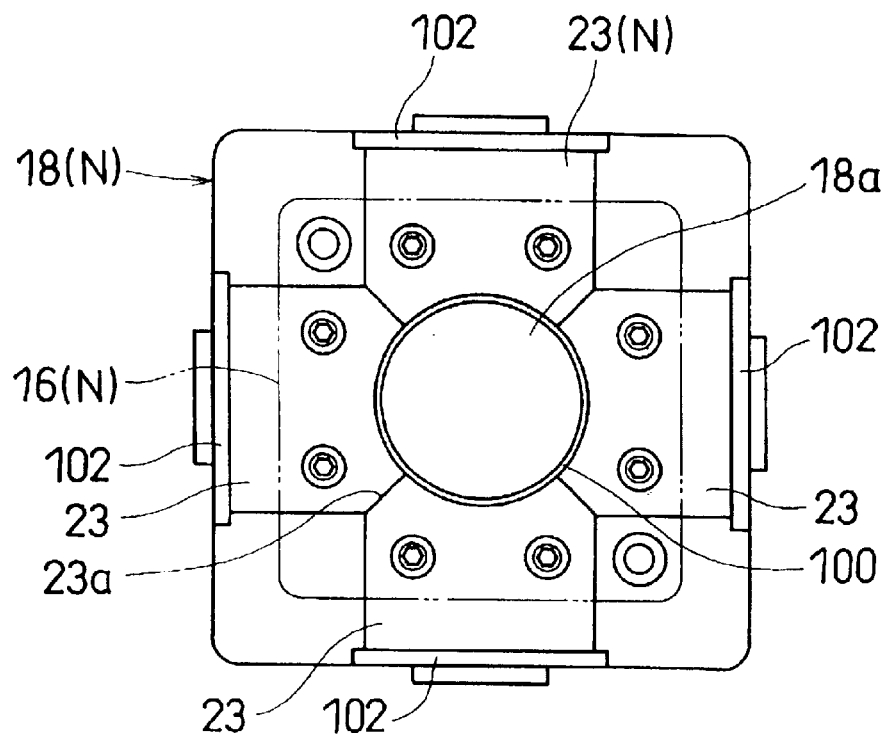
FIG. 19 is a front elevational view which shows a movable side exclusive portion of the molding die shown in FIGS. 16 to 18.
Figure 20:
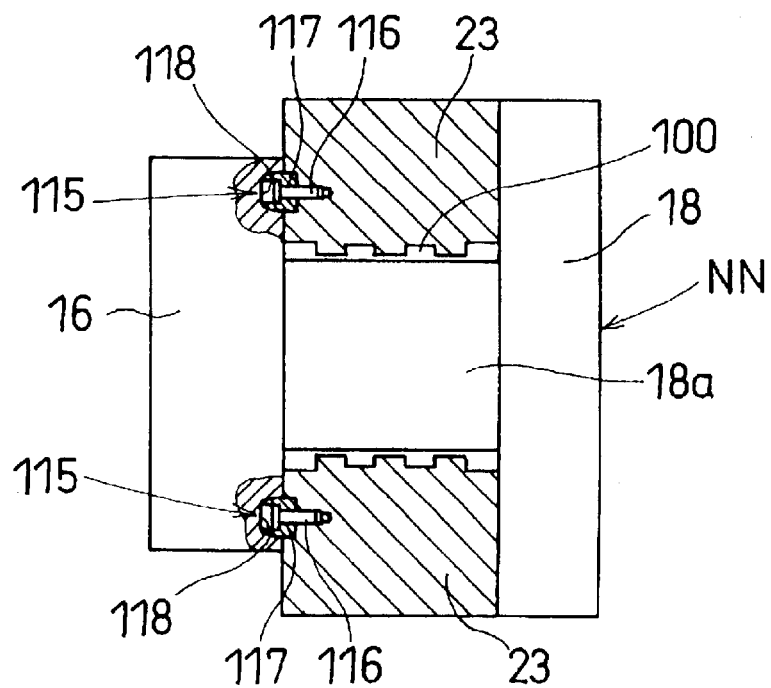
FIG. 20 is a cross sectional view of the molding die shown in FIGS. 16 to 18, and shows a structure part for integrally fixing a slide core.

The slide cores 23 corresponding to the exclusive portion N of the slide 14 are embedded into a wide receiving groove 101 radially formed in the movable insert 18, as shown in FIGS. 19 and 20. A back plate 102 is fixed to the back surface of each of the slide cores 23. In the slide core 23, a position for making the back plate 102 sit on a step portion 103 provided in a side edge in an inlet side of the receiving groove 101 of the movable insert 18 constitutes an insert end with respect to the movable insert 18. Further, in the insert end of the slide core 23 with respect to the movable insert 18, taper surfaces 23a in the leading end portions of the respective slide cores 23 are combined in a substantially closely attached state. Accordingly, an annular cavity 100 is formed in the periphery of a convex forming portion 18a of the movable insert 18.

The slide holder 22 corresponding to the general portion of the slide 14 is arranged in a front surface of the movable platen 3 in such a manner as to freely move in an intersecting direction to the die opening and closing direction, as shown in FIGS. 16 to 18. The attaching and detaching mechanism O for attaching and detaching the slide holder 22 and the slide core 23 is constituted, as shown in FIG. 16, by a clamp apparatus 104 which engages and inserts a T-shaped clamper 105 embedded into each of the slide holders 22 with a T-shaped slot 106 provided in the back surface portion (including the back plate 102) of the slide core 23. The clamp apparatus 104, in this case, commonly uses an existing slide driving cylinder 107 (refer to FIGS. 16 to 18) as driving means for the T-shaped clamper 105. The cylinder 107 is fixed to the movable main die 17 via a bracket 108, and the T-shaped clamper 105 is coaxially connected to a piston rod of the cylinder 107. The clamp apparatus 104 also has a rotary mechanism basically having the same structure as a rotary mechanism for a driving means 38 for driving the T-shaped clamper 34, which is installed in the movable main die 17, for rotating the T-shaped clamper.

The T-shaped clamper 105 constituting the clamp apparatus 104 mentioned above moves forward to the side of the movable insert 18 integrally with the slide holder 22 in accordance with the extension of the piston rod of the slide driving cylinder 107, and is embedded to the T-shaped slot 106. Then, the clamp apparatus 104 rotates the T-shaped clamper 105 by 90 degrees after inserting the head portion of the T-shaped clamper 105 to the T-shaped slot 106. Further, the clamp apparatus 104 shortens the piston rod 109 of the cylinder 107, whereby the connection between the slide holder 22 and the slide core 23 is completed.

On the contrary, a concavo-convex fitting means 115 corresponding to the connection mechanism P for detachably connecting the exclusive portions N to each other is provided in a joint portion between the slide core 23 and the fixed insert 16, as shown in FIG. 20. The concavo-convex fitting means 115 is constituted by a convex member 117 fixed to the side surface of the slide core 23 by using a bolt 116, and a fitting hole 118 formed on the end surface of the fixed insert 16. The convex member 117 and the fitting hole 118 are mutually formed in taper shapes so as to be fitted in a tapered manner, and are automatically and smoothly fitted to each other in accordance with the die closing between the fixed die 11 and the movable die 12.

The fixed insert 16 and the movable insert 18 are connected and integrated in the die close state by the ball lock mechanism 61 corresponding to the connection mechanism P as mentioned above, and accordingly, the slide core 23 is held between the connected and integrated fixed insert 16 and movable insert 18 so as to be prevented from coming off by the concavo-convex fitting means 115. In this case, since the pressing plate 21 corresponding to the exclusive portion N of the pressing means 13 is prevented from coming off with respect to the movable insert 18, all of the fixed insert 16, the movable insert 18, the slide core 23 and the pressing plate 21 constructed as the exclusive portion N are connected and integrated in the die close state (the lump state) with each other as shown well in FIG. 18. That is, the exclusive portion N can be taken out as the lump state from the general portion M.

At a time of integrating the fixed insert 16 with the movable insert 18 fixed to the movable main die 17, the opening and closing motion of the movable die 12 with respect to the fixed die 11 is utilized. In particular, since the fixed insert 16 and the movable insert 18 are closely attached by changing from the die unclamp state shown in FIG. 16 to the die clamped state shown in FIG. 17, the dies are connected and integrated in the die close state by the ball lock mechanism 61 (FIG. 16) at this time. Further, the fixed main die 15 and the movable main die 17 can be set in the die unclamp state with the fixed insert 16 being integrated with the movable insert 18 fixed to the movable main die 17, as shown in FIG. 15, by canceling the connection between the fixed main die 15 and the fixed insert 16 achieved by the clamp apparatus 31 and opening the dies. Accordingly, it is possible to complete the preparation for performing die changing of the exclusive portion assembly 16, 18 by the die changing apparatus 200, and it is possible to perform die changing of the new and old inserts in accordance with the procedures mentioned above.

Operations and effects obtained by the embodiment in accordance with the present invention having the structure mentioned above are as follows.

First, in the embodiment in accordance with the present invention, the die changing operation can be efficiently performed by drawing out the exclusive portion N which is automatically attached to and detached from the general portion M of the molding die by the attaching and detaching mechanism O from the general portion M or pressing the exclusive portion N to the general portion M, by means of the feeding means 201 of the die changing apparatus 200. Further, the subject to be treated by the feeding means 201 in the die changing operation is only the exclusive portion N in the molding die, and the subject to be treated by the die changing operation is small and light in comparison with the case that the whole of the die is changed. Therefore, it is easy to make the structure of the die changing apparatus 200 simple, and movement at a high speed is possible. Therefore, it is possible to make the die changing apparatus simple and promote the high speed die changing operation.

Further, it is possible to transmit the power for drawing out and pressing the exclusive portion N within the die casting machine in the die unclamp state to the exclusive portion N by means of the die carrying means 203. Moreover, it is possible to accurately move and guide the exclusive portion N at a time of drawing out and pressing the exclusive portion N by means of the guide means 204. Accordingly, it is possible to smoothly perform die changing of the exclusive portion N.

Further, it is possible to perform the drawing out and pressing operation of the exclusive portion N with respect to the general portion M, by means of the moving body 207. That is, it is possible to smoothly perform die changing of the exclusive portion N by setting the die casting machine 1 in the die unclamp state and utilizing the space formed by the die unclamping.

In this case, it is possible to make the moving body move with a predetermined angle with respect to the die opening and closing direction. It is preferable to set the angle mentioned above within a range of an angle 5 degrees with respect to the die opening and closing direction, as mentioned above. Then, in the case that the angle set is performed, the structure is made such that the drawing direction of the exclusive portion N with respect to the general portion M has a predetermined angle with respect to the die opening and closing direction. In this case, it is possible to prevent the exclusive portion N from being undesirably drawn out from the general portion M caused by the die opening and closing at a time when die changing of the exclusive portion N is performed. As a result, there can be obtained an advantage that it is possible to prevent the exclusive portion N from being undesirably drawn out from the general portion M, for example, even in the case that a trouble is generated in the clamping cylinder of the T-shaped clamper 34 (refer to FIG. 16) and the drawing force of the T-shaped clamper 34 is reduced.

Further, since the moving body 207 is automatically attached to and detached from the exclusive portion N by the ball lock mechanism 206 corresponding to the clamp mechanism, it is possible to promote automation of the drawing and pressing operation of the exclusive portion N with respect to the general portion M. Accordingly, it is possible to smoothly perform die changing of the exclusive portion N. In the embodiment in accordance with the present invention, there is exemplified as one example of the clamp mechanism, the case that the ball lock mechanism 206 is employed. However, the same operation and effect can be obtained even by replacing the ball lock mechanism 206 by the other clamping mechanism.

Further, it is possible to secure the position accuracy of the exclusive portion N in the horizontal direction by the guide roller 210 to the side of the moving passage provided in the die changing apparatus 200, to secure the position accuracy of the exclusive portion N in the vertical direction by the guide roller 211 below the moving passage, and accurately perform the drawing and pressing operation of the exclusive portion N with respect to the general portion M.

Further, a predetermined gap can be secured between the exclusive portion N and the general portion M at a time of pressing the exclusive portion N to the general portion M, by the gap holding means provided to the side of the exclusive portion N. Since the rolling bearings 212 and 213 are used as the gap holding means, it is possible to secure the predetermined gaps Y and Z between the exclusive portion N and the general portion M at a time of pressing the exclusive portion N to the general portion M, it is possible to accurately perform the pressing operation of the exclusive portion N with respect to the general portion M, it is possible to prevent the friction between the general portion M and the exclusive portion N, and it is possible to smoothly perform the pressing operation.

Further, it is possible to accurately perform the drawing and pressing operation of the exclusive portion N with respect to the general portion M by fixing the die carrying means 203 and the guide means 204 to the predetermined position with respect to the general portion M by a positioning means 205. The positioning means 205 is constituted by the retractable pins 214 and 215 engaging with the holes 51 and 52 formed in the general portion M. It is possible to fix the die carrying means 203 and the guide means 204 to the predetermined position with respect to the general portion M, and it is possible to accurately perform the drawing and pressing operation of the exclusive portion N with respect to the general portion M, by extending the pins 214 and 215, as necessary, so as to engage with the holes 51 and 52 formed in the general portion M.

Further, since the feeding means 201 is provided on the carrying means 251 movable between the inner and outer sides of the die casting machine, it is possible to carry the exclusive portion N moved from the general portion M so as to be drawn out to the predetermined position in the inner portion of the die casting machine 1 in the die unclamp state by the feeding means 201, to the outer side of the die casting machine 1 by the carrying means 251. Further, it is possible to carry another exclusive portion N into the predetermined position within the die casting machine 1 from the outer side of the die casting machine 1 by the carrying means 251, and it is possible to press the exclusive portion N existing at the predetermined position to the predetermined position within the general portion M by the feeding means 201.

Further, in accordance with the embodiment of the present invention, it is possible to carry the exclusive portion N (the old insert) drawn out to the predetermined position from the general portion M within the die casting machine 1 in the die unclamp state to the outer side of the die casting machine 1 by the carrying means 251. Further, it is possible to carry another exclusive portion (the new insert) from the outer side of the die casting machine 1 to the predetermined position within the die casting machine by the carrying means 251. In the die changing operation mentioned above, since the subject to be treated by the carrying means 251 is only the exclusive portion N in the molding die, and the subject to be treated by the die changing operation is small and light in comparison with the case that the whole of the die is changed, it is easy to make the structure of the die changing apparatus 200 simple, and movement at high speed is possible. Therefore, it is possible to make the die changing apparatus simple and promote the high speed die changing operation.

Further, since the carrying means 251 is provided with the shift means for moving a plurality of shift tables 202 having the mounting portion for the exclusive portion N in the direction orthogonal to the die opening and closing direction, it is possible to mount the exclusive portion N drawn out from the general portion M to the predetermined position on one of a plurality of shift tables 202, it is possible to move the shift table 202 in the direction orthogonal to the die opening and closing direction by the shift means, and displace another exclusive portion N (the new insert) previously mounted to another shift table 202 to the predetermined position. That is, it is possible to displace the exclusive portion N (the new and old inserts) subject to die changing by moving (shifting) the shift table 202.

Further, the carrying means 251 is provided with the base plate 253 having the shape capable of moving on the general portion die changing rollers 301, 302, 303 and 304. Moreover, the carrying means 251 is provided with the shift table 202 on the base plate 253, the guide rail 256 placed substantially all around the depth of the base plate 253, and the cylinder 257 having the stroke capable of moving the shift table 202 all around the guide rail 256, which correspond to the shift means.

That is, in accordance with the embodiment of the present invention, the carrying means 251 is constructed on the base plate 253. Further, since it is possible to displace the exclusive portion N (the new and old inserts) subject to die changing only by moving (shifting) the shift table 202 on the base plate 253 at a limited distance, it is possible to replace the new and old inserts for a short time.

Further, since the base plate 253 has the shape allowing the base plate 253 to move on the general portion die changing rollers 301, 302, 303 and 304. Further, it is possible to commonly carry in and out the exclusive portion N on the general portion die changing rollers 301, 302, 303 and 304, and it is possible to effectively make good use of the existing equipment.

In this case, in the case that the general portion die changing rollers 301, 302, 303 and 304 are structured such as to transfer the base plate 253 at the obtuse angle or the acute angle with respect to the die opening and closing direction, it is possible to provide the space to the side of the die casting machine 1 and it is possible to effectively make good use of the space. In such a case, since the shift direction of the shift table 202 becomes the obtuse angle or the acute angle with respect to the die opening and closing direction, it is possible to provide the space to the side of the die casting machine 1, and it is possible to effectively make good use of the space.

Further, the base plate 253 is provided with the supporting means which is brought into contact with the rigid portion of the die casting machine 1 at the necessary time and supports the base plate 253 from below, it is possible to support the base plate 253 from below by the supporting means, and prevent the positioning accuracy of the exclusive portion N with respect to the general portion M from being reduced.

Further, as the supporting means mentioned above, there is provided with the jack 258 grounding on the tie bar 6 of the die casting machine 1. Accordingly, it is possible to prevent the positioning accuracy of the exclusive portion N with respect to the general portion M from being reduced due to the deformation of the base plate 253 by grounding the jack 258 on the tie bar 6 corresponding to the main constituting part of the die casting machine 1 and having an extremely high rigidity so as to support the base plate 253 from below. Therefore, it is possible to smoothly perform the die changing of the exclusive portion N.

In this case, in accordance with the embodiment of the present invention, in order to effectively make good use of the carrying truck 300 and the relay table 400 which are conventionally provided in the die casting machine 1 as the die changing equipment for the die, there is employed the structure in which the carrying means 251 of the die changing apparatus 200 is constructed on the base plate 253 having the shape allowing the base plate 253 to move on the general portion die changing rollers 301, 302, 303 and 304, and the feeding means 201 is piled up on the carrying means. However, the structure may be made such that the shift table 202 itself of the feeding means 201 is driven in the direction intersecting the die opening and closing direction by an exclusive transferring mechanism without using the carrying truck 300 and the relay table 400.

Further, in accordance with the embodiment of the present invention, the description is given of the case that die changing of the new and old inserts are performed by the die changing apparatus 200 after the fixed insert 16 and the movable insert 18 are integrated, by exemplification. However, it is possible to perform die changing of only the movable insert 18 by using the die changing apparatus 200.

Further, the die changing apparatus 200 in accordance with the embodiment of the present invention may be used for performing die changing of the molding die in the other molding machines than the die casting machine.

What is claimed is:

1. A die changing apparatus of a molding die, which includes a commonly formed general portion, and an exclusive portion having a cavity, said exclusive portion being automatically attached to and detached from the general portion mounted to a molding machine by an attaching and detaching mechanism, the die changing apparatus further comprising:

a feeding means for drawing out said exclusive portion to a predetermined position apart from said general portion and pressing another exclusive portion having a cavity at said predetermined position to a predetermined position within said general portion, within the molding machine in a die unclamp state.

2. A die changing apparatus as claimed in claim 1, wherein said feeding means is provided with a die carrying means which is engaged with said exclusive portion so as to move, and a guide means for guiding said exclusive portion onto a predetermined moving passage.

3. A die changing apparatus as claimed in claim 2, wherein said die carrying means is constituted by a moving body which moves in a die opening and closing direction or with a predetermined angle with respect to the die opening and closing direction.

4. A die changing apparatus as claimed in claim 3, wherein said moving body is provided with a clamp mechanism which is capable of being automatically attached to and detached from said exclusive portion.

5. A die changing apparatus as claimed in any one of claims 2 to 4, wherein said guide means is provided with a guide roller disposed to a side of the moving passage of said exclusive portion and a guide roller disposed below the moving passage.

6. A die changing apparatus as claimed in claim 2, wherein said guide means includes a gap holding means which is provided at said exclusive portion side and holds a gap between said exclusive portion and said general portion at a time of pressing said exclusive portion into said general portion.

7. A die changing apparatus as claimed in claim 6, wherein said gap holding means is a rolling bearing which is elastically energized to an exclusive portion mounting recess portion of said general portion.

8. A die changing apparatus as claimed in claim 2, wherein said feeding means is provided with a positioning means for fixing said die carrying means and said guide means to a predetermined position with respect to said general portion.

9. A die changing apparatus as claimed in claim 8, wherein said positioning means is a retractable pin which is engaged with a hole formed in said general portion.

10. A die changing apparatus as claimed in claim 2, wherein said carrying means is provided in a feeding means which is movable between an outer portion of the molding machine and an inner portion of the molding machine.

11. A die changing apparatus as claimed in claim 10, wherein said carrying means is provided with a shift means for moving a plurality of tables having mounting portions for said exclusive portion in a direction intersecting to the die opening and closing direction.

12. A die changing apparatus as claimed in claim 11, wherein a base plate having a shape allowing the base plate to move on a roller for performing die changing of said general portion is provided, and said plurality of tables and said shift means are provided on said base plate.

13. A die changing apparatus as claimed in claim 12, wherein said base plate is provided with a supporting means which is brought into contact with a rigid portion of the molding machine at a time of necessity and supports said base plate from below.

14. A die changing apparatus as claimed in claim 13, wherein said supporting means is a jack grounded on a tie bar of the molding machine.

* * * * *